US006535860B1

(12) United States Patent
Kuo et al.

(10) Patent No.: US 6,535,860 B1
(45) Date of Patent: Mar. 18, 2003

(54) DESIGN AND HARDWARE SYNTHESIS OF ADAPTIVE WEIGHTED FUZZY MEAN IMAGE FILTER

(75) Inventors: Yau-Hwang Kuo, Tainan (TW); Chao-Lieh Chen, Tainan (TW); Chang-Shing Lee, Tainan (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 09/366,049

(22) Filed: Aug. 2, 1999

(51) Int. Cl.$^7$ ................................................. G06N 7/02
(52) U.S. Cl. ........................ 706/1; 706/2; 706/3; 706/4; 706/5
(58) Field of Search ................................ 706/1, 2, 3, 4, 706/5, 8

(56) References Cited

U.S. PATENT DOCUMENTS 5,581,494 A   12/1996   Sommen et al. ............ 364/724

OTHER PUBLICATIONS

Chang–Shing Lee; Yau–Hwang Kuo, Adaptive weighted fuzzy mean filter, Fuzzy Systems, 1996., Proceedings of the Fifth IEEE International Conference on, vol. 3, Sep. 8–11, 1996, pp. 2110–2116 vol. 3.*
Chang–Shing Lee; Yau–Hwang Kuo; Pao–Ta Yu, Weighted fuzzy mean filters for heavy–tailed noise removal, Uncertainty Modeling and Analysis, 1995, and Annual Conference of the North American, Fuzzy Information Processing Society. Proceedings of ISUMA—NAFI.*
IEEE Trans. of Circuits . . . , vol. 44, No. 5, Tan et al, "Image Filtering Using Hyperstable . . . ", pp. 358–370, May 1997.
IEEE Trans. on Fuzzy Systems, vol. 3, No. 2, Zeng et al, "Approximation Theory of Fuzzy . . . ", pp. 219–235, May 1997.
Fuzzy Sets and Systems 89, Lee et al, "Weighted fuzzy mean filters for image processing", pp. 157–180, 1997.
IEEE Journal of Solid–State Cir. , vol. 24, No. 2, Song, "A 10.7–MHz Switched–Capacitor . . . ", pp. 320–324, Apr. 1989.
IEEE Trans. on Fuzzy Systems, vol. 6, No. 2, Kuo et al, "Generic LR Fuzzy Cells for Fuzzy . . . ", pp. 266–285, May 1998.
IEEE Journal of Solid–State Cir., vol. 27, No. 12, Silva–Martinez et al, "A 10.7–MHZ . . . ", pp. 1843–1853, Dec. 1992.

* cited by examiner

Primary Examiner—Wilbert L. Starks, Jr.
(74) Attorney, Agent, or Firm—Jacobson Holman PLLC

(57) ABSTRACT

This invention proposes a novel nonlinear filter called adaptive weighted fuzzy mean (AWFM) filter which is capable of removing high density Gaussian impulse noises in polluted images. Via a single epoch, weights of the filter are departed according to a set of fuzzy rules, which are constructed by a proposed procedure. All the fuzzy rules in the knowledge base infer concurrently for input nature estimation and filter adaptation. Statistic analyses ensure that this AWFM filtering possesses robust and consistent performance even when images are thoroughly polluted. The AWFM filter is synthesized with generic LR fuzzy cells which adopts CMOS analog current mode technology to subject high speed, low power, and small circuit area objectives. Simulations show that parallel inferences realized by the generic LR fuzzy cells, each of which performs 20 M FLIPS (fuzzy logic inferences per second) promise that the synthesized AWFM filter is able to process up to 50 256×256 images per second.

15 Claims, 29 Drawing Sheets

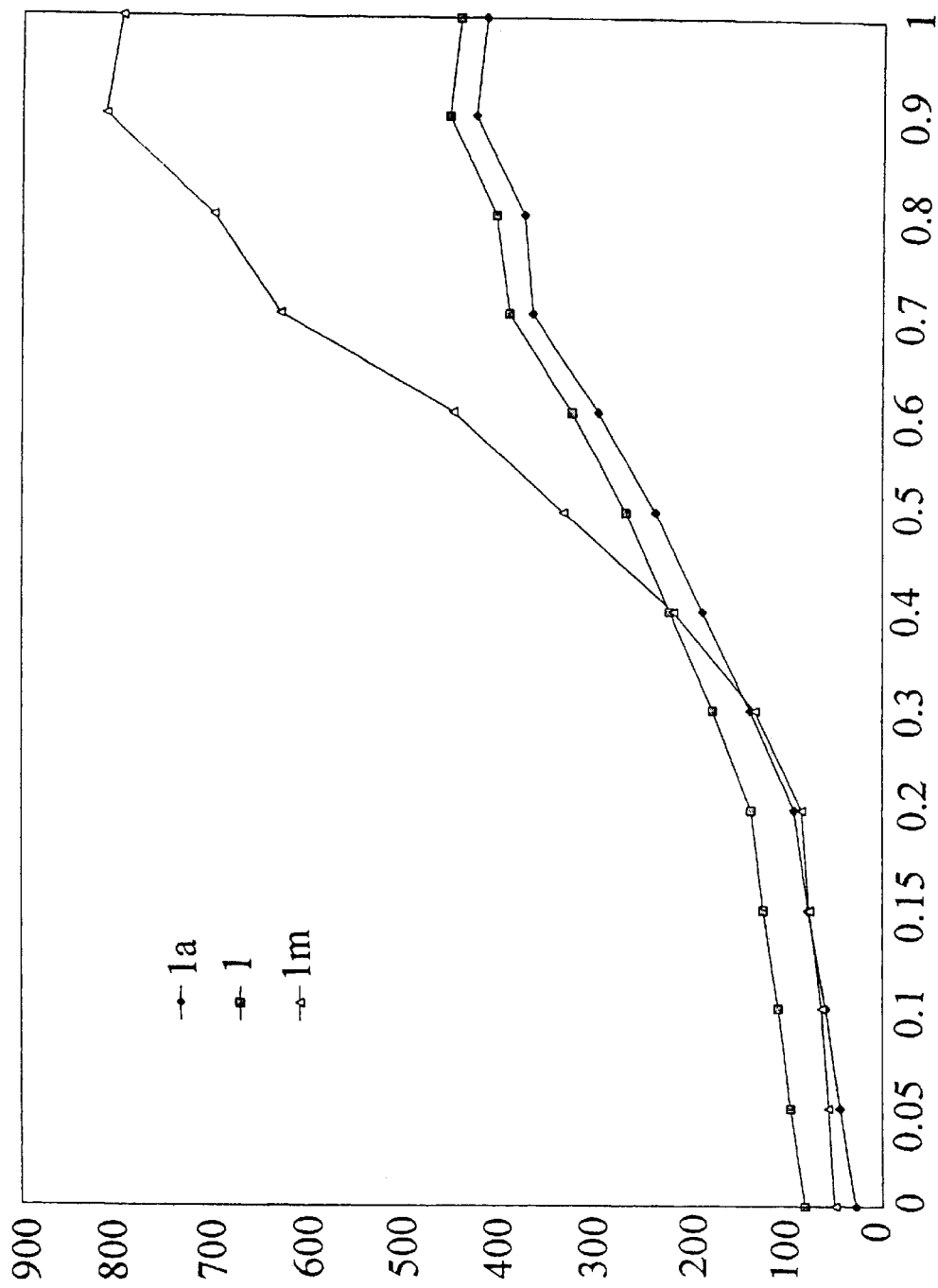

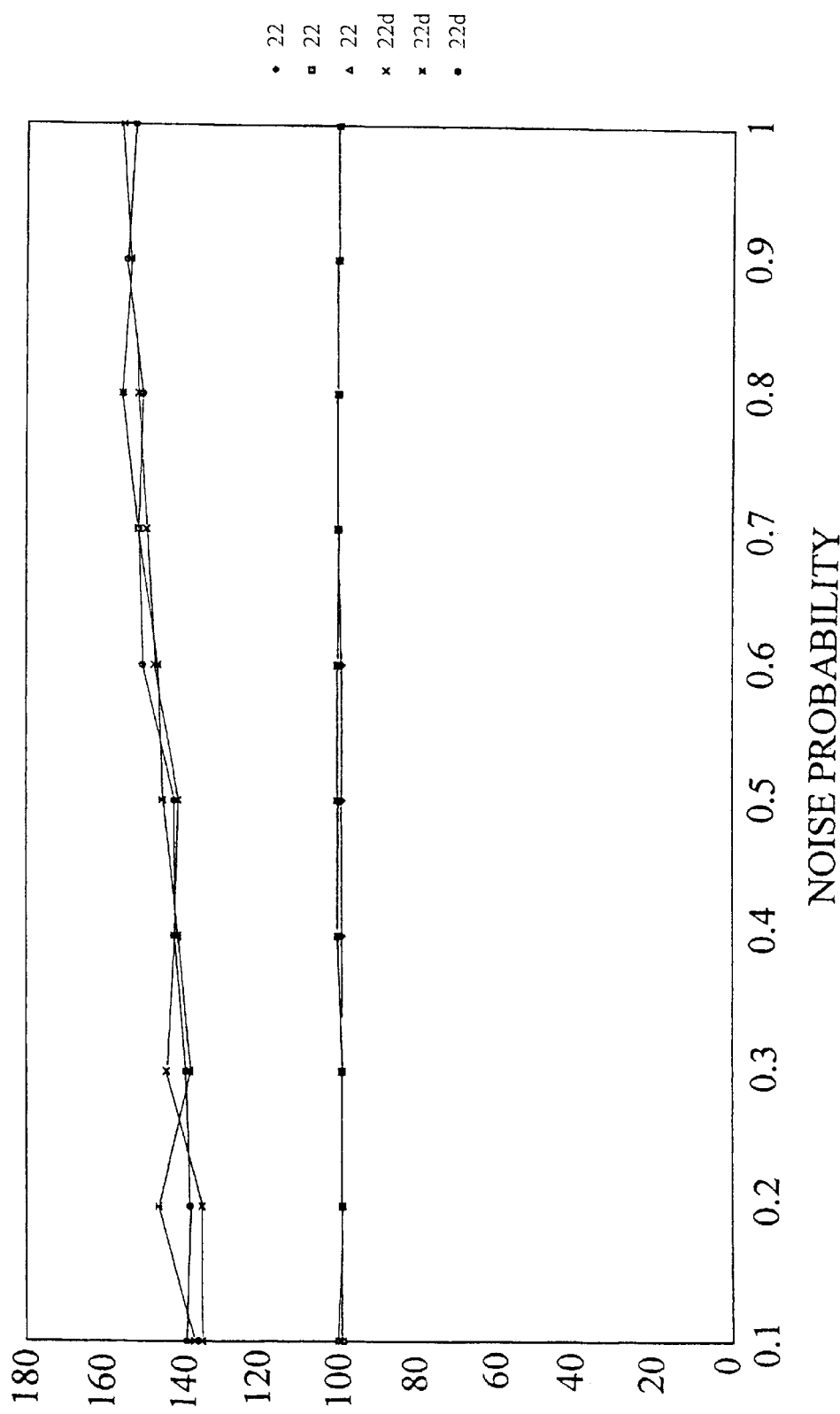

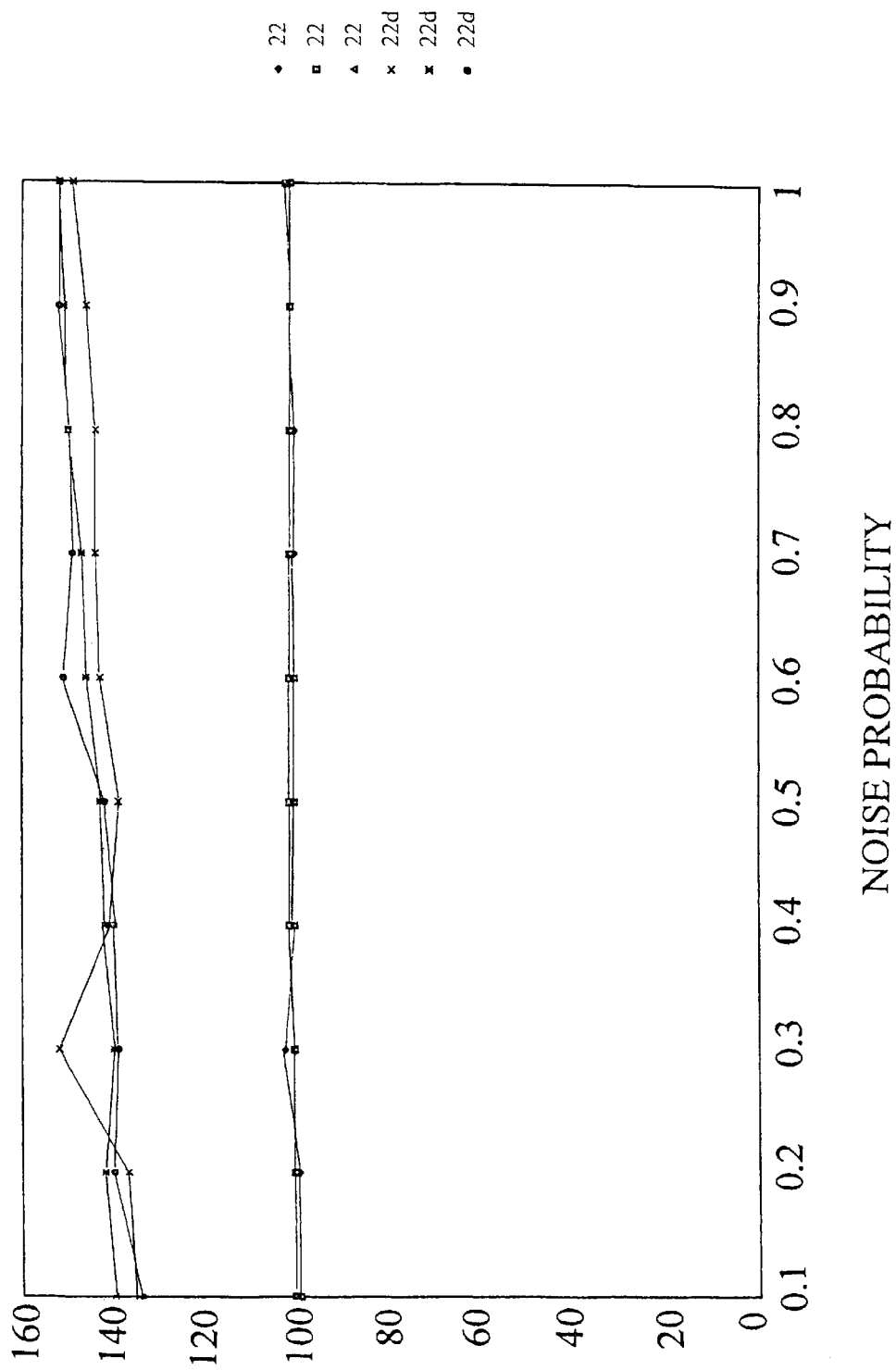

IMPULSE AMPLITUDE

IMPULSE AMPLITUDE

DESIGN AND HARDWARE SYNTHESIS OF ADAPTIVE WEIGHTED FUZZY MEAN IMAGE FILTER

FIELD OF THE INVENTION

This invention proposes a novel nonlinear filter called adaptive weighted fuzzy mean (AWFM) filter which is capable of removing high density Gaussian impulse noises in polluted images.

BACKGROUND OF THE INVENTION

Conventionally, nature of input signal is essential when one is designing non-adaptive non-time-variant filters. However, uncertainty exists because one is unable to obtain desired information about input signal or because input signal is time-variant. In order to overcome this uncertainty problem, adaptive algorithm has been proposed by many researchers such as A. C. Tan etc. in IEEE Trans. Circuits Syst. II Vol. 44 (5) p358–370 (1997). Among the proposed adaptive algorithms such as that proposed by Petrus C. W. etc. in 1996 U.S. Pat. No. 5,581,494, recurrent methods of either Least Mean Square Error or Least Mean Absolute Error are introduced for parameter adjustments. But when the desired signal is unable to obtain or is uncertain in nature, reasonable results can't be possible by the methods above. In addition, repeating recurrent estimations can slow down the filter, which is not appropriate for high speed filtering. In view of hardware fabrication, complex circuits are required by recurrent estimations, either Least Mean Square Error or Least Mean Absolute Error, in order to manage data storage and the recurrent process. By current technology, it's still not feasible to achieve filtering with small circuits and high speed operation. Hence, the present invention proposes a direct method for adaptive filtering as well as a corresponding method of hardware synthesis in order to achieve the objectives. The adaptive, filter proposed in the present invention is highly stable and can quickly as well as effectively restore the polluted image without recurring estimations. The image can be recovered no matter how high the S/N level is. In addition, the filter in the present invention is input-dependent and time-variant in nature so that parameters can be weighted according to the input signal and there is no need to acquire nature of the input.

DESCRIPTION OF THE PRIOR ART

Recently fuzzy set theory, such as by X. J. Zeng in IEEE Trans. Fuzzy Systems Vol. 3 (2) p219–235 (1995), has been successfully applied on the estimations for non-linear systems or systems with uncertainty. The theory has the advantages of small memory requirement, short adapting time, and easy fabrication. Base on the theory of fuzzy logics, the present invention proposes a AWFM filter which can adapt itself according to a number of fuzzy rules. The AWFM filter can be treated as the extension of the WFM filter reported by C. S. Lee in Int. J. Fuzzy Sets and Systems Vol. 89 (2) 157–180 (1997). These fuzzy rules can be obtained by a simple algorithm without recurrent adaptations. FIG. 1 shows block diagrams of the AWFM filter. When the input signal $x(i, j)$ reaches WFM, a set of fuzzy rule in the knowledge base is carried out to adjust weights of the WFM. The output of WFM, $y_{wfm}(i, j)$, is then sent to another set of fuzzy rules for quality evaluation and weight adjustment so that the fuzzy detector can detect the noise level $\xi(i, j)$. Final output of the AWFM is determined by the, dynamic seletor among $\xi(i, j)$, $y_{wfm}(i, j)$, $y_{wfm}(i, j)+\xi(i, j)$, and $y_{wfm}(i, j)-\xi(i, j)$.

In the hardware aspect, there are two major conventional categories for the synthesis of filters: (1) the analog data sampling technique by B. S. Song in IEEE J. of Solid-State Circuits Vol. 24 p.320–324 (1989), or ROC Patent Announcement No.135264 and 217475; (2) the continuous-time technique by J. Silva-Martinez in IEEE J. of Solid-State Circuits p993–1001 (1993), ROC Patent Announcement No.182719, 159301, and 143145. The former has higher accuracy in low noise applications while the latter can be applied for high frequency application. However, conventional filters are linear in nature without input-dependent or time-variant considerations. The present invention proposes a hardware synthesis method which introduces generic LR fuzzy cells adopted CMOS current mode, reported by the inventors in IEEE Trans. on Fuzzy Systems Vol. 6 (2) p266–285 (1998). The generic LR fuzzy cells are well proven for high speed fuzzy logic estimations and show good CMOS noise immunity. Many types of fuzzy rules can be represented by connecting these generic cells such as gates in conventional digital systems.

WFM Filter

In general, a WFM filter is a mean filter based on fuzzy number calculations. Conventional mean filters can't remove highly polluted impulse noises while WFM filters can, well and easily. Considering a clean image S with L gray levels, the gray value for each pixel lies between 0 and L−1 so that the gray scale pollution for the pixels in S can be represented by a fuzzy subset [0, L−1]. Each fuzzy subset represents an abstract concept (i.e. brightness) for the gray value, for example, dark (DK), median (MD), or bright (BR). Membership functions of these fuzzy subsets decide how each pixel relates to a specific abstract concept. The fuzzy subset can be obtained from the gray scale histogram according to C. S. Lee in Int. J. Fuzzy Sets and Systems vol. 89 (2) p157–180 (1997), or given by a specialist in the field. When transferring to the input of a image processing system, image S may be polluted so a filter is necessary for removing noises. Let $X=[x(i, j)]_{N_1 \times N_2}$ and $Y=[y_{WFM}(i, j)]_{N_1 \times N_2}$ represent the original image and the WFM filtered image respectively, pixel $x(i, j)$ in X could be polluted by noise so that the gray value changes to $x(i, j)=s(i, j)+n(i, j)$. It is the WFM filter's job to estimate $s(i, j)$ with filtered signal $y_{WFM}(i, j)$ by the fuzzy subsets.

According to H. J. Zimmermann in Fuzzy set theory and its applications, the fuzzy sets used in WFM filters are L-R type, which can be represent by $$\mu_M(x) = \begin{cases} L\left(\frac{m_M - x}{\alpha_M}\right), & \text{for } x \leq m_M \\ R\left(\frac{x - m_M}{\beta_M}\right), & \text{for } x > m_M \end{cases} \quad (1)$$

where $L(y)=R(y)=LR(y)=\max(0, 1-y)$ for any real. In other words L and R equal to LR. $\mu_M(x)$ can be represented by $[m_M, \alpha_M, \beta_M]_{LR}$. Let WFM(·) represent the function of WFM filters, the $(i, j)$th filtered pixel can be expressed by $$y_{WFM}(i, j) = WFM(X_{a \times b}(i, j)) \quad (2)$$

where $$X_{3\times3}(i, j) = \begin{bmatrix} x(i-1, j-1) & x(i-1, j) & x(i-1, j+1) \\ x(i, j-1) & x(i, j) & x(i, j+1) \\ x(i+1, j-1) & x(i+1, j) & x(i+1, j+1) \end{bmatrix} \quad (3)$$

Functions of WFM filters can be described by a set of fuzzy rules defined as followed:

Definition 1

Fuzzy rules for WFM filters can be generally expressed by:

If $U$ is $M$ then $V$ is $f_M(U)$ where M is a fuzzy set expressed by $[m_M, \alpha_M, \beta_M]_{LR}$, both U and V are matrix $[u(i, j)]_{a\times b}$ and $[v(i, j)]_{a\times b}$ (in WFM, a=b=3), so the subject "U is M" and "V is $f_M(U)$" mean $[u(i, j)$ is $M]_{a\times b}$ and $[v(i, j)$ is $f_M(U)]_{a\times b}$. So the result fuzzy set $f_M(U)$ is defined by:

$$f_M(U) = \{(\mu_M(u(i, j)), u(i, j)) | \forall u(i, j) \in U\}$$

where $\mu_M(u(i, j))$ coresponses to input $u(i, j)$ on the assumption that $u(i, j)$ is the matching degree of M.

The fuzzification formula is as follow:

$$v = \frac{\sum_{i=1}^{a} \sum_{j=1}^{b} \mu_M(u(i, j)) \times u(i, j)}{\sum_{i=1}^{a} \sum_{j=1}^{b} \mu_M(u(i, j))} \quad (4)$$

To filt a pixel, a WFM filter first constructs three fuzzy rules for three different fuzzy mean procedures:

Rule 1: If X is DK then $Y_{DK}$ is $f_{DK}(X)$

Rule 2: If X is MD then $Y_{MD}$ is $f_{MD}(X)$

Rule 3: If X is BR then $Y_{BR}$ is $f_{BR}(X)$ where DK represents the fuzzy set for "dark", MD for "medium", BR for "bright". These fuzzy rules will generate three crisp values $y_{DK}$, $y_{MD}$, and $y_{BR}$ after defuzzification. Beside the three fuzzy mean procedures, WFM filters also carries out a fuzzy estimation defined by Rule 4.

Definition 2

H. J. Zimmermann has reported a LR type of fuzzy interval I (see Fuzzy set theory and its applications) in 1991, where membership functions of I are constructed by two functions L and R, and four parameters: $(m_{Il}, m_{Ir}) \in R^2 \cup \{-\infty, \infty\}$, $\alpha_I$ and $\beta_I$. The fuzzy interval $I=[m_{Il}, m_{Ir}, \alpha_I, \beta_I]_{LR}$ can be expressed by $$\mu_I(x) = \begin{cases} L\left(\frac{m_{Il} - x}{\alpha_I}\right), & \text{for } x \leq m_{Il} \\ 1, & \text{for } m_{Il} \leq x \leq m_{Ir} \\ R\left(\frac{x - m_{Ir}}{\beta_I}\right), & \text{for } x \geq m_{Ir} \end{cases} \quad (5)$$

Definition 3

According to C. S. Lee etc. in Int. J. Fuzzy Sets and Systems Vol. 89 (2) p157–180, (1997), ES which is described by the fuzzy estimator of WFM filters can be accomplished by the following fuzzy rule, Rule 4: If X is I then the fuzzy estimate ES of X is $f_I(X)$ where X is a sampling matrix based on x(i, j), I is the fuzzy interval obtained by histogram. Defuzzification es(X) for Rule 4 can be obtained according to equation (4).

Finally, Rule 5 represents a decision procedure, which selects one output among that of Rule 1 through 3 as the final output for WFM filters:

Rule 5: IF $Y_t$ is closest_to_ES then $y_{WFM}$ is $f_{closest\_to\_ES}(Y_t)$ where vector $Y_t=(y_{DK}, y_{MD}, y_{BR})$ and fuzzy set closest_to_ES which defined in [0, L−1] can be described by the following membership function:

$$\mu_{closest\_to\_ES}(u) = \begin{cases} 1, & \text{if } u = \arg\left[\min_{y_t \in Y_t}(|y_t - es|)\right], \\ 0, & \text{otherwise.} \end{cases} \quad (6)$$

BRIEF DESCRIPTION OF THE DRAWINGS

Table 1: Shown truth table, for the priority selection circuit in WFM filters.

Table 2: Shown truth table for the priority selection circuit in the dynamic selector.

Table 3: Shown effectiveness comparisons of AWFM, WFM, medium filters on various Gaussian impulse noises.

Figure 1:
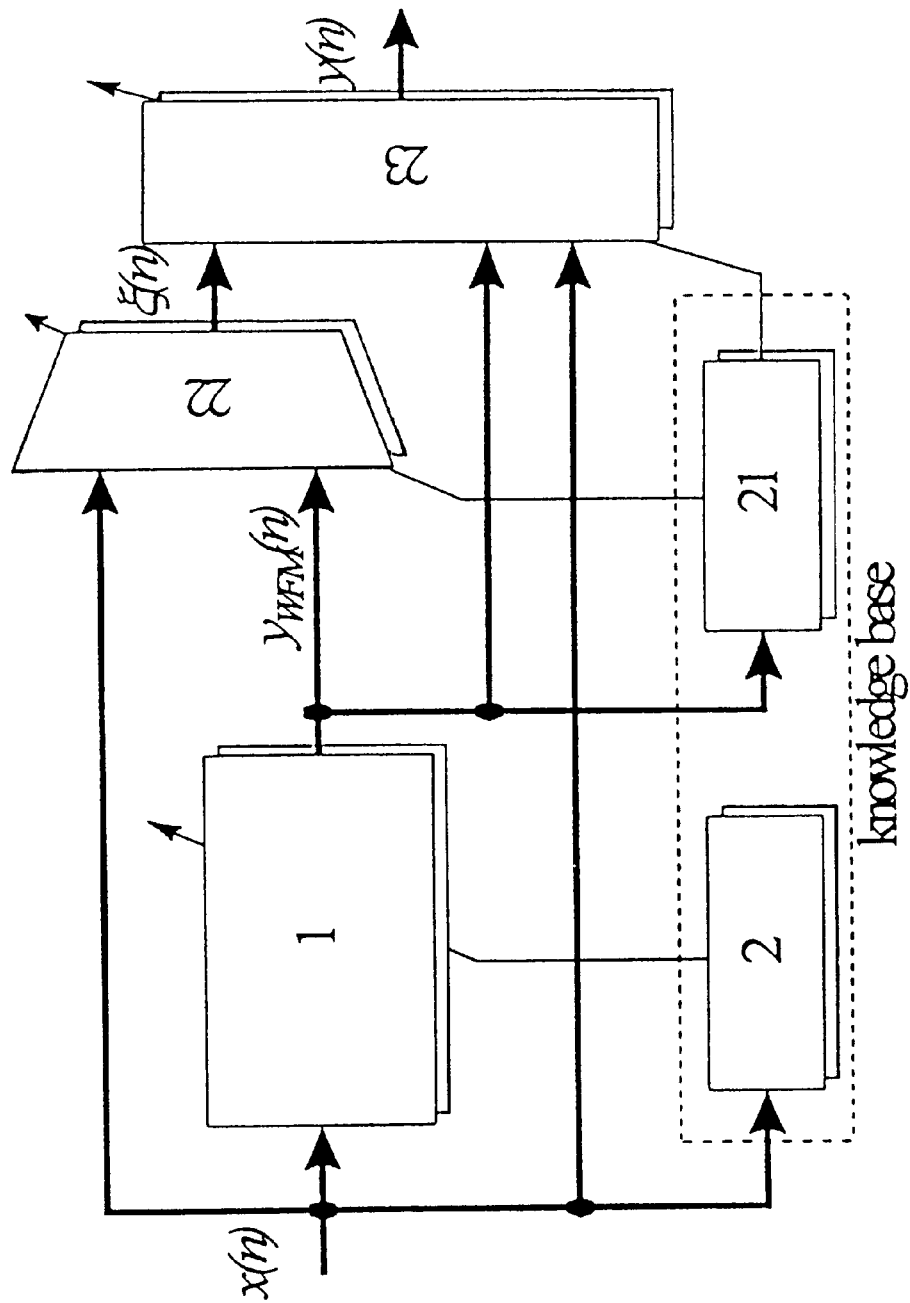

FIG. 1: Shown block diagrams of AWFM filters.

Figure 2A:
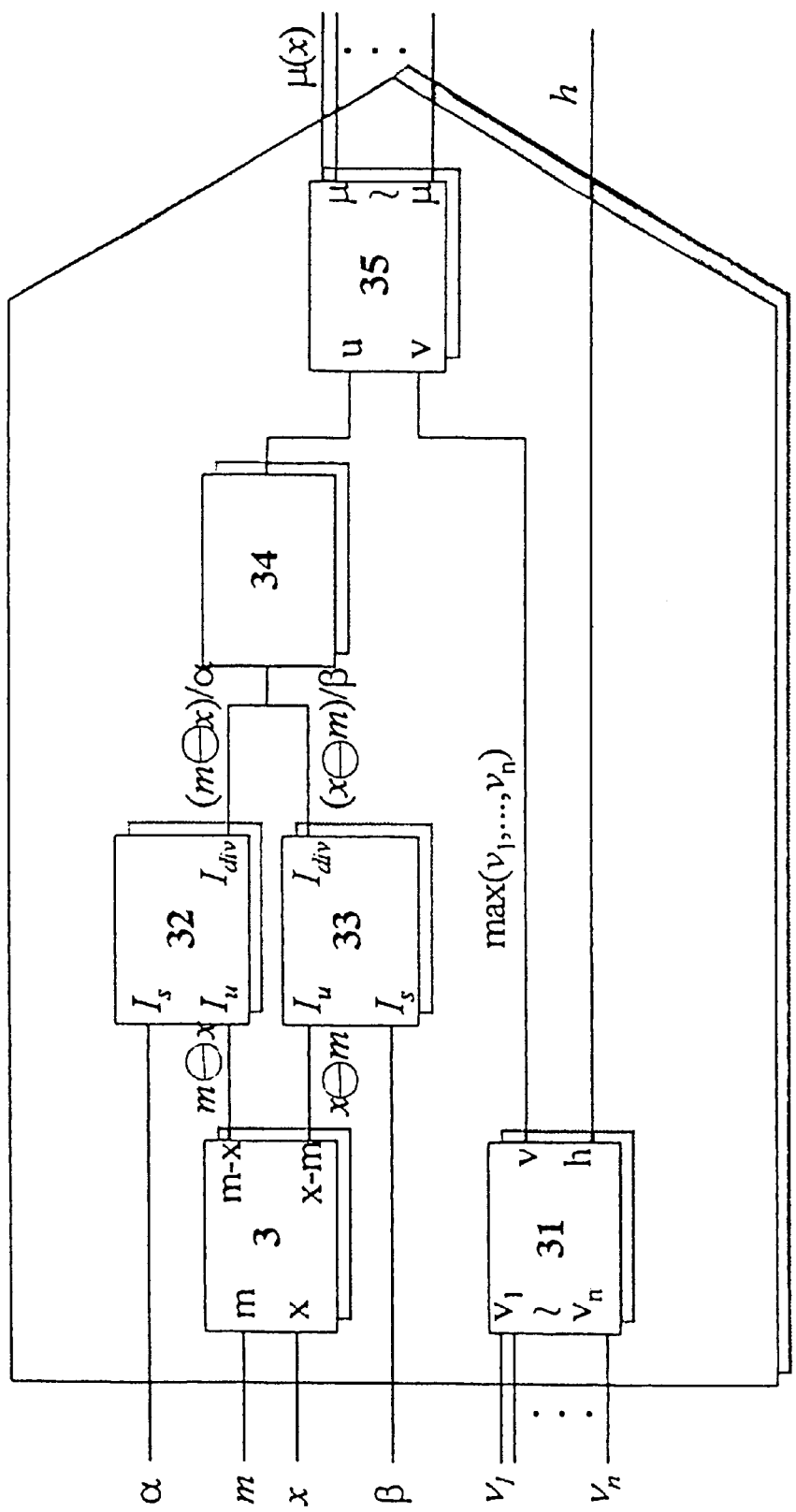
Figure 2B:
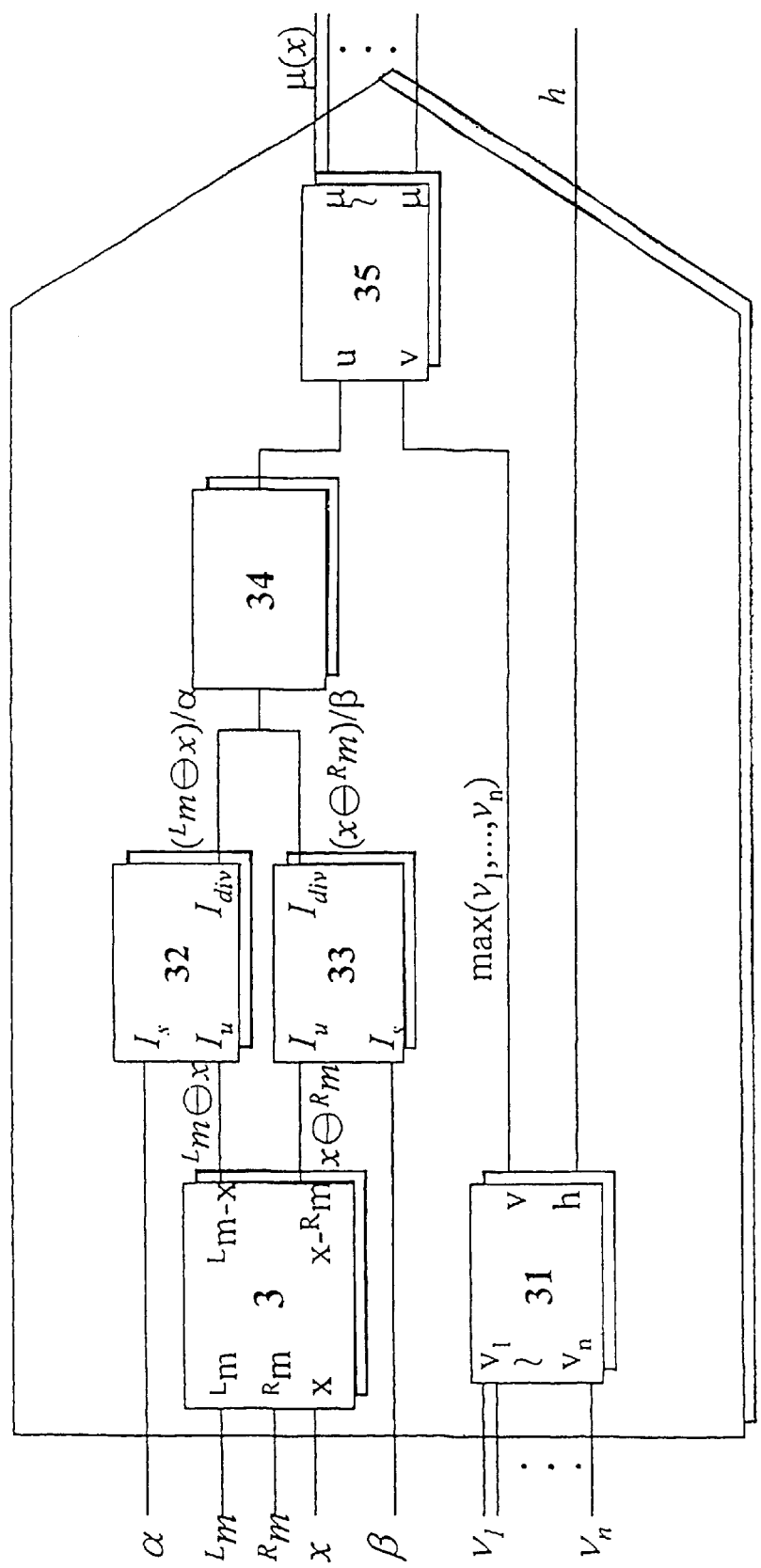
Figure 3A:
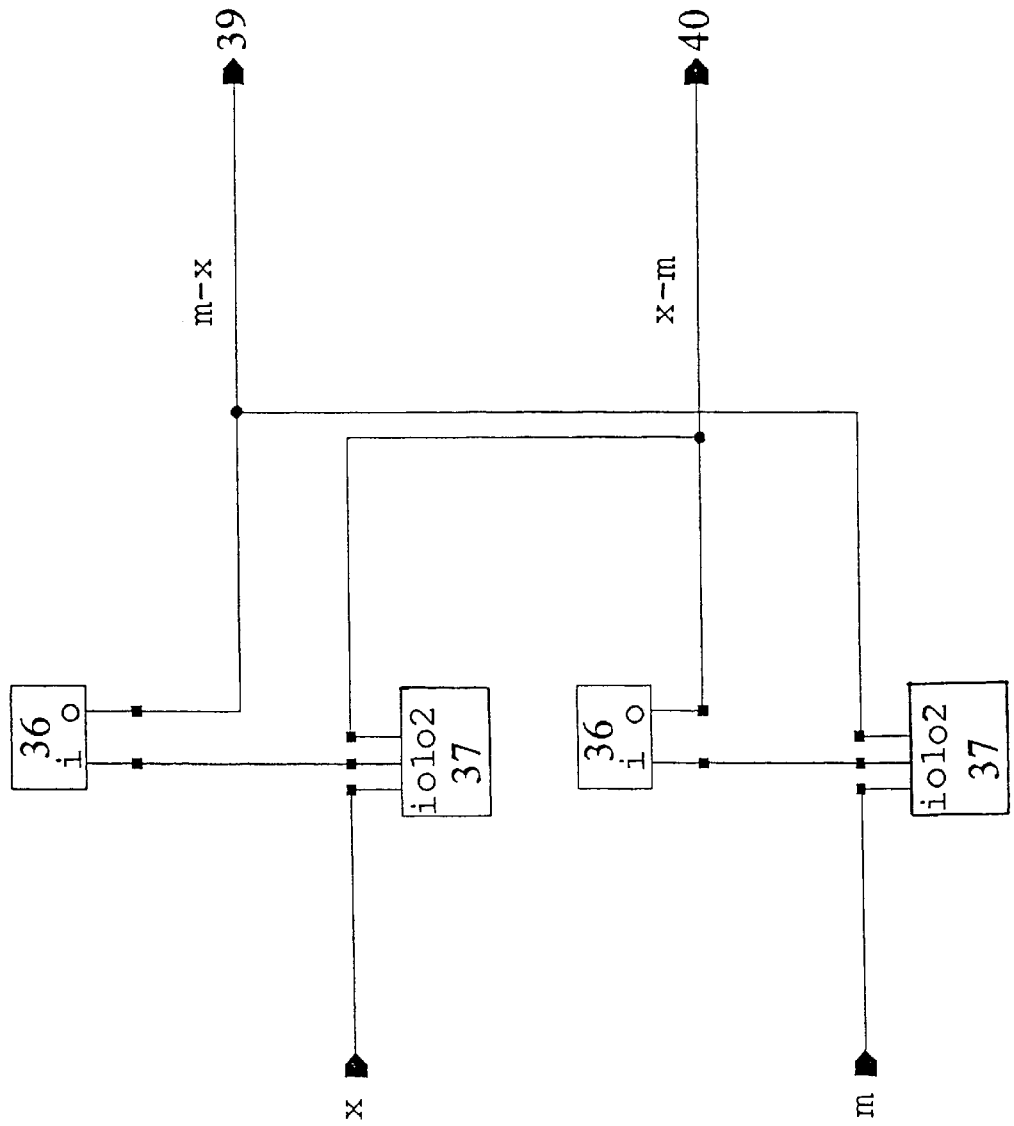
Figure 3B:
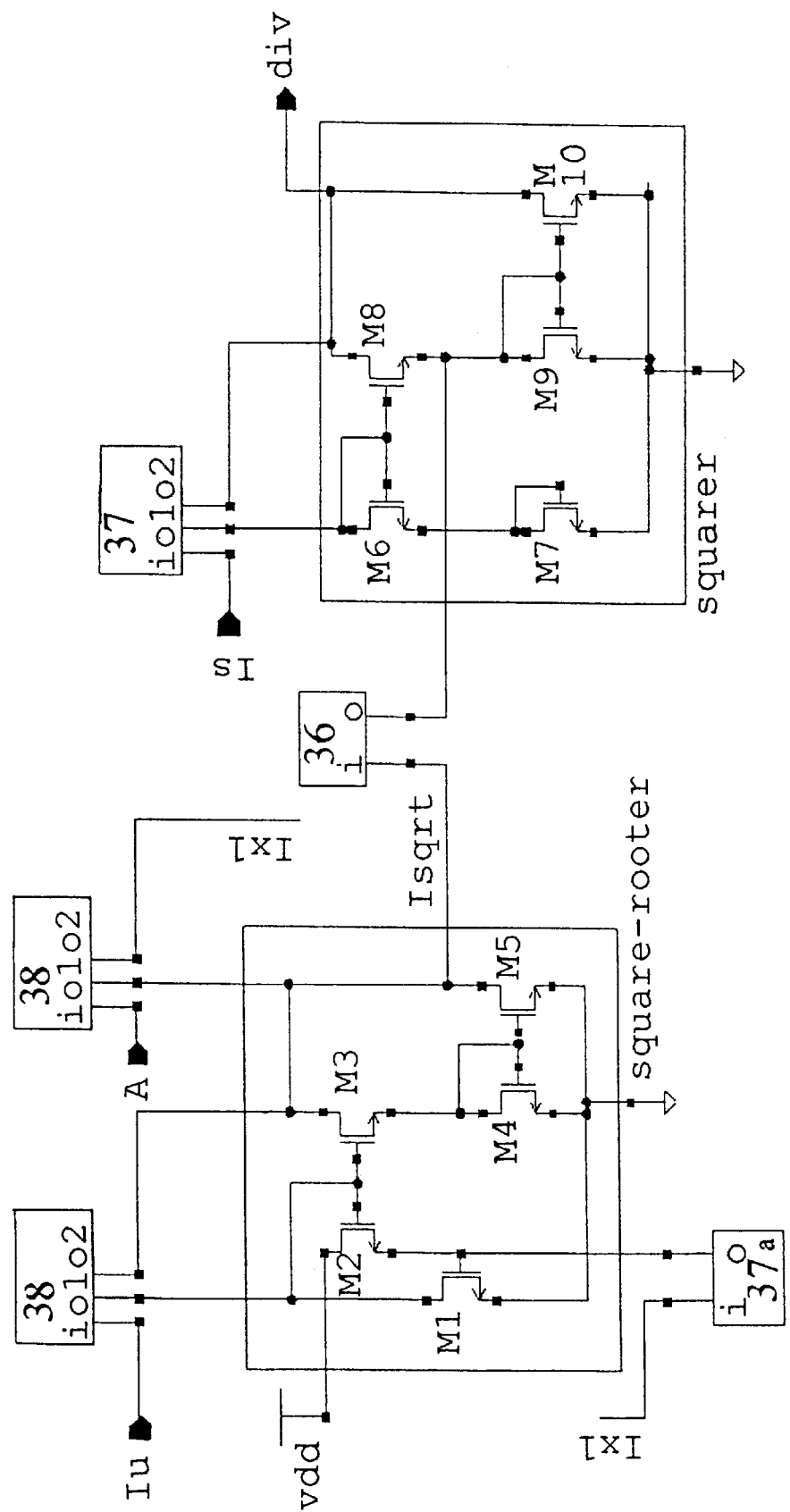

FIG. 2: Shown functional block diagrams of two types of generic LR implication cells FIG. 2(a) fuzzy sets with membership functions of single mode FIG. 2(b) fuzzy intervals with mode intervals FIG. 3: Shown details for the SUB circuit and the DIV circuit used by generic LR cells FIG. 3(a) SUB circuit FIG. 3(b) DIV circuit FIG. 4: Shown architecture of defuzzification cells FIG. 5: Shown synthesis of WFM filters FIG. 5(a) architecture of WFM filters FIG. 5(b) synthesis of fuzzy rules in [definition 1] by generic LR fuzzy cells FIG. 5(c) synthesis of the decision module in WFM filters FIG. 6: Shown details for the MAX circuit in the decision module of WFM filters FIG. 7: Shown combination of the MAX circuit and the priority selection circuit in WFM filters FIG. 8: Shown architecture of the fuzzy detector FIG. 9: Shown architecture of the dynamic selector FIG. 10: Shown MAE curves and MSE curves of AWFM, WFM, and medium filters Ia . . . AWFM filters I . . . WFM filters Im . . . medium filters FIG. 10(a): Shown MAE curves of AWFM, WFM, and medium filters for polluted image "Lena", where x is the noise probability p FIG. 10(b): Shown MAE curves of AWFM, WFM, and medium filters for polluted image "Baboon", where x is the noise probability p FIG. 10(c): Shown MSE curves of AWFM, WFM, and medium filters for polluted image "Lena", where x is the noise probability p FIG. 10(d): Shown MSE curves of AWFM, WFM, and medium filters for polluted image "Baboon", where x is the noise probability p FIG. 11: Shown comparisons between the fuzzy detector and the conventional detector on image "House" (impulse amplitude is 100)

FIG. 12: Shown comparisons between the fuzzy detector and the conventional detector on image "Lena" (impulse amplitude is 100)

Figure 13:
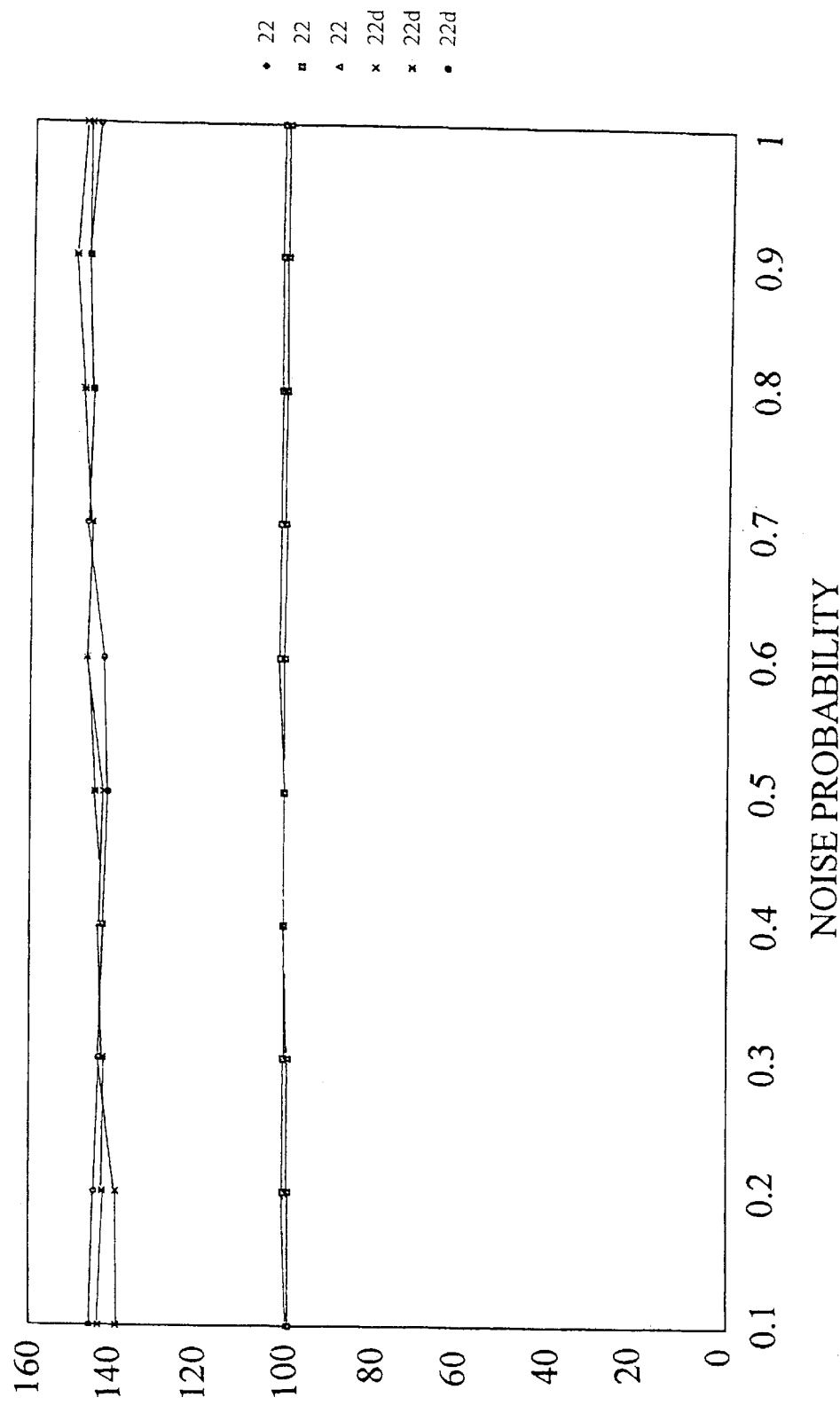

FIG. 13: Shown comparisons between the fuzzy detector and the conventional detector on image "Airplane" (impulse amplitude is 100)

Figure 14:
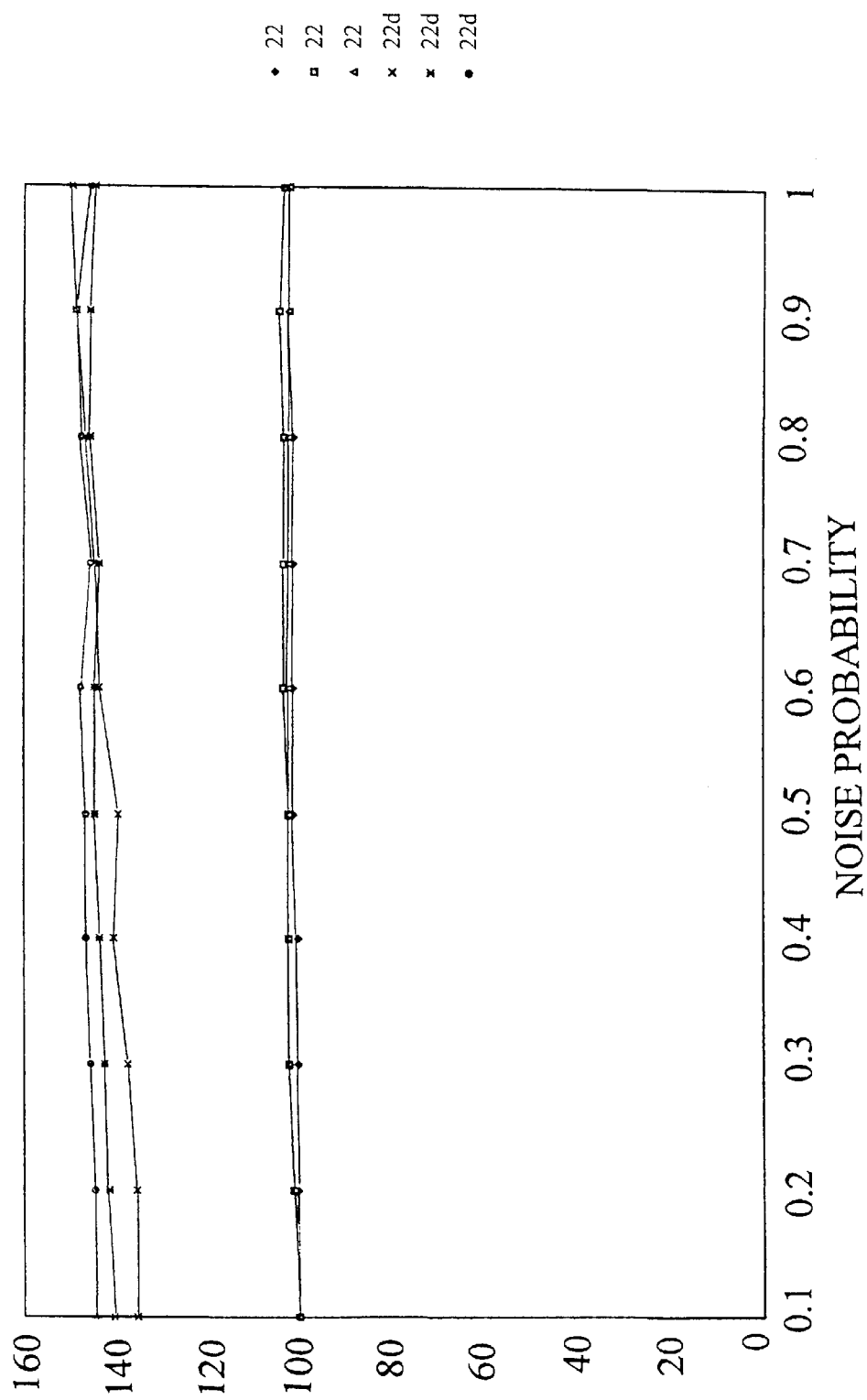

FIG. 14: Shown comparisons between the fuzzy detector and the conventional detector on image "Sailboat" (impulse amplitude is 100)

FIG. 15: Shown effectiveness evaluations on AWFM filters with noise ration=0

Figure 15A:
Figure 15B:
Figure 15C:
Figure 15D:
Figure 15E:
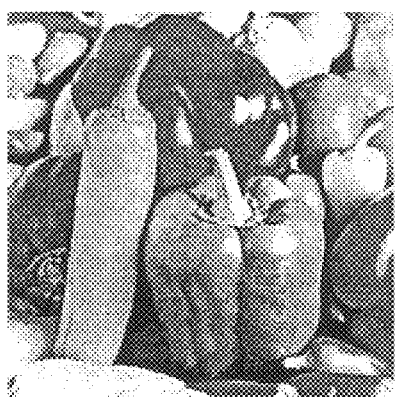
Figure 15F:
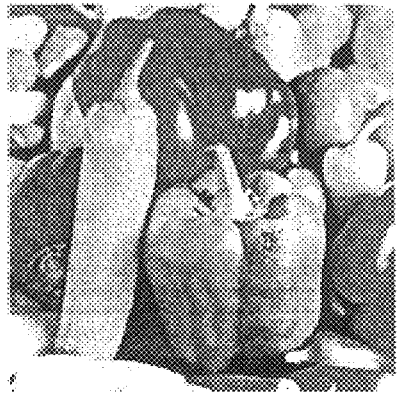
Figure 15G:
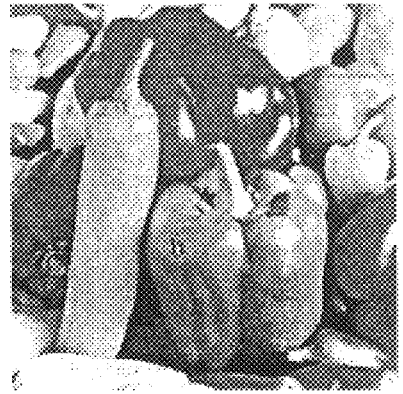
Figure 15H:
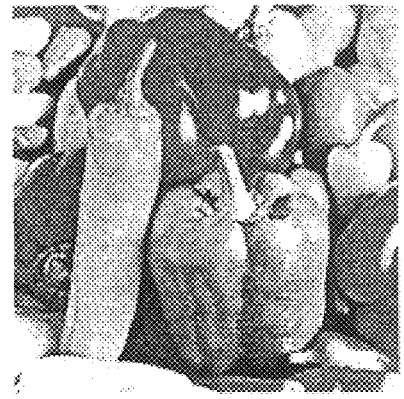
Figure 16A:
Figure 16B:
Figure 16C:
Figure 16D:
Figure 16E:
Figure 16F:
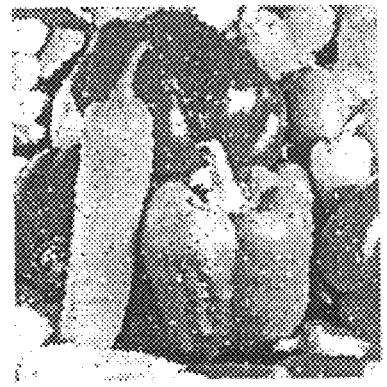
Figure 16G:
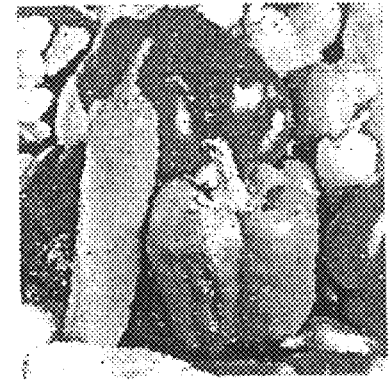
Figure 16H:
Figure 17A:
Figure 17B:
Figure 17C:
Figure 17D:
Figure 17E:
Figure 17F:
Figure 17G:
Figure 17H:
Figure 18A:
Figure 18B:
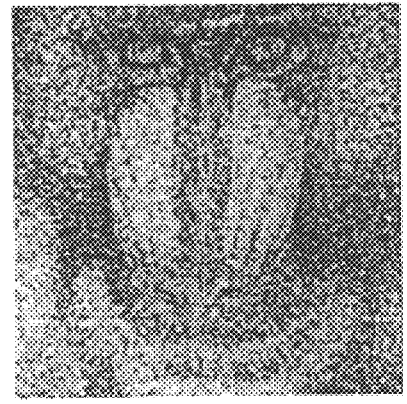
Figure 18C:
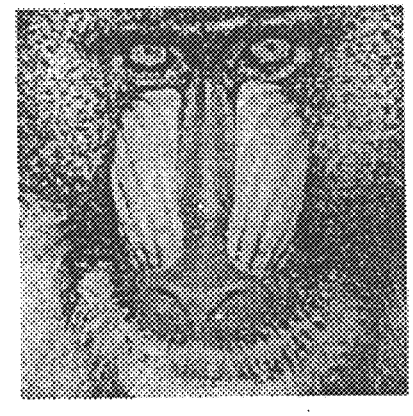
Figure 18D:
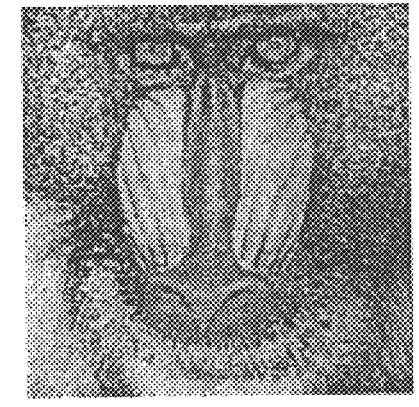
Figure 19A:
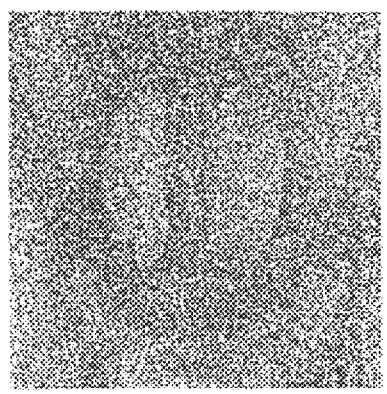
Figure 19B:
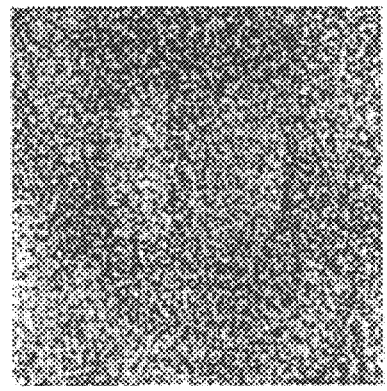
Figure 19C:
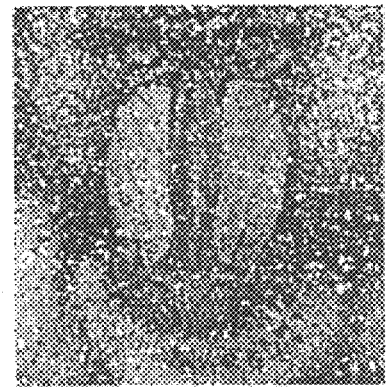
Figure 19D:
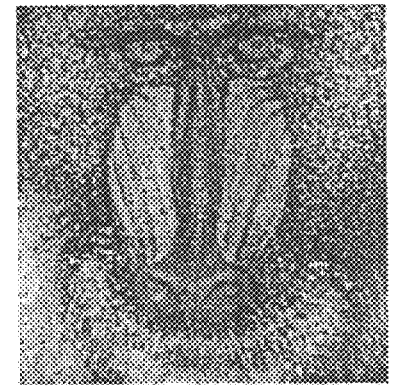

FIG. 15(a): Lena,
FIG. 15(b): medium filtered,
FIG. 15(c): WFM filtered,
FIG. 15(d): AWFM filtered,
FIG. 15(e): Peppers,
FIG. 15(f): medium filtered,
FIG. 15(g): WFM filtered,
FIG. 15(h): AWFM filtered FIG. 16: Shown effectiveness evaluations on AWFM filters FIG. 16(a): image "Lena" with noise ratio p=0.5
FIG. 16(b): medium filtered,
FIG. 16(c): WFM filtered,
FIG. 16(d): AWFM filtered,
FIG. 16(e): image "Peppers" with noise ratio p=0.5
FIG. 16(f): medium filtered,
FIG. 16(g): WFM filtered,
FIG. 16(h): AWFM filtered FIG. 17: Shown, effectiveness evaluation on AWFM filters FIG. 17(a): image "Lena" with noise ratio p=1
FIG. 17(b): medium filtered,
FIG. 17(c): WFM filtered,
FIG. 17(d): AWFM filtered,
FIG. 17(e): image "Peppers" with noise ratio p=1,
FIG. 17(f): medium filtered,
FIG. 17(g): WFM filtered,
FIG. 17(h): AWFM filtered FIG. 18: Shown testings on image "Baboon"
FIG. 18(a): Gaussian impulse noise ratio p=0.2
FIG. 18(b): average filtered
FIG. 18(c): medium filtered
FIG. 18(d): AWFM filtered FIG. 19: Shown testings on image "Baboon"
FIG. 19(a): Gaussian impulse noise ratio p=1
FIG. 19(b): average filtered
FIG. 19(c): medium filtered
FIG. 19(d): AWFM filtered

REFERENCE NUMBER OF THE ATTACHED DRAWINGS

1 . . . WFM filter
3 . . . substractor
2,21 . . . fuzzy rules
22 . . . fuzzy detector
23 . . . dynamic selector
31 . . . MAX
312 . . . $max_2$
32,33 . . . DIV
311 . . . $max_1$
313 . . . $max_3$
314 . . . $max_4$
34 . . . LR(x)
35 . . . MIN
36 . . . cmirrorp
37 . . . cmirrorn 2
39 . . . mSUBx
36a. . . cmirrorp 2, P-type Metal Oxide Semiconductor current mirror with two outputs 55 . . . rull scale (255) current source
54,96 . . . Prioritized selection
4 . . . DFZ
40 . . . xSUBm
41 . . . Mul/Div
42 . . . Current copier, current mirror
5y . . . decision module ($y_{WFM}$)
51 . . . rule module 1 for fuzzy set $f_1$
52 . . . rule module 2 for fuzzy set $f_2$
5e . . . rule module ES for fuzzy estimator
5m . . . rule module m for fuzzy set $f_m$
81 . . . rule module 1 for fuzzy interval I_pos
82 rule module 1 for fuzzy interval I_neg
91 . . . I_unc
92 . . . I_und 1
93 . . . I_und 2
94 . . . I_pos
95 . . . I_neg

DETAILED DESCRIPTIONS OF THE INVENTION

Design of Adaptive AWFM Filters

AWFM filters are the extension of WFM filters reported by the inventors, C. S. Lee etc., in Int. J. Fuzzy Sets and Systems Vol. 89 (2) p157–180 (1997). Equipped with a fuzzy detector and a dynamic selection procedure, the WFM based AWFM filter can filter Gaussian impulse noises of any levels. In order to design a AWFM filter, first definitions of fuzzy signal space should be made:

Definition 6

A fuzzy signal space is the signal space divided by several fuzzy intervals. The intervals comprises fuzzy uncorrupted subspace, fuzzy positive subspace, fuzzy negative subspace, and fuzzy undecided subspace. These subspaces can be expressed by the following fuzzy intervals:

(1) definition of I_unc:

$$\text{I\_unc} = \left[ -2^{n-3}, 2^{n-3}, 2^{\lfloor \frac{n}{2} \rfloor}, 2^{\lfloor \frac{n}{2} \rfloor} \right]_{LR} \tag{7}$$

(2) definition of I_pos:

$$\text{I\_pos} = \left[ \xi\_\text{pos}, 2^n - 1, 2^{\lfloor \frac{n}{2} \rfloor}, 1 \right]_{LR} \tag{8}$$

(3) definition of I_neg:

$$\text{I\_neg} = \left[-(2^n-1), -\xi\_\text{neg}, 1, 2^{\lfloor\frac{n}{2}\rfloor}\right]_{LR} \quad (9)$$

(4) definition of I_und:

$$\text{I\_und} = \left[2^{n-3}+1, \xi\_\text{pos}-1, 2^{\lfloor\frac{n}{2}\rfloor}, 2^{\lfloor\frac{n}{2}\rfloor}\right]_{LR} \quad (10)$$

or $$\text{I\_und} = \left[-\xi\_\text{neg}+1, -2^{n-3}-1, 2^{\lfloor\frac{n}{2}\rfloor}, 2^{\lfloor\frac{n}{2}\rfloor}\right]_{LR} \quad (11)$$

where $\xi\_\text{pos}$ and $\xi\_\text{neg}$ are two constants obtained by the histogram of the image according to C. S. Lee in Proc. of Seven IFSA World Congress, Prague, vol2 p279–284 (1997).

Next, the fuzzy detector used to estimate amplitudes is defined:

Definition 7

The fuzzy detector $f_D(\cdot)$ is used to detect mean amplitude $\xi$ of Gaussian Impulse noises in the polluted images. It is triggerd by the following fuzzy rules:

Rule d1: if $\Delta$ is I_pos then $D_1$ is $f_{I\_pos}(\Delta)$
Rule d2: if $\Delta$ is I_neg then $D_2$ is $f_{I\_neg}(\Delta)$
Rule d3: if D_ is AV then $\xi$ is $f_{AV}(D)$ where $\Delta=[\delta(i,j)]_{axb}$, and $\delta(i,j)=x(i,j)-y_{WFM}(i,j)$; $D=[d_1, d_2]$ and $d_1, d_2$ are defuzzification results of Rule d1 and Rule d2 respectively.

The dynamic selector determines the final filtered output according to the following rules, where $\mu_{I\_unc}(\delta(i,j))$, $\mu_{I\_und}(\delta(i,j))$, $\mu_{I\_pos}(\delta(i,j))$, and $\mu_{I\_neg}(\delta(i,j))$ are membership grades between $\delta(i,j)$ and I_unc, I_und, I_pos, and I_neg.

Rule s1: if $$\max(\mu_{1\_unc}(\delta(i,j)), \mu_{1\_und}(\delta(i,j)), \mu_{1\_pos}(\delta(i,j)), \mu_{1\_neg}(\delta(i,j))) = \mu_{1\_unc}(\delta(i,j)),$$

then the original input $x(i,j)$ is selected as the final output.

Rule s2: if $$\max(\mu_{1\_unc}(\delta(i,j)), \mu_{1_{13}\_und}(\delta(i,j)), \mu_{1\_pos}(\delta(i,j)), \mu_{1\_neg}(\delta(i,j))) = \mu_{1\_und}(\delta(i,j)),$$

then WFM output $y(i,j)$ is selected as the final output.

Rule s3: if $$\max(\mu_{1\_unc}(\delta(i,j)), \mu_{1\_und}(\delta(i,j)), \mu_{1\_pos}(\delta(i,j)), \mu_{1\_neg}(\delta(i,j))) = \mu_{1\_pos}(\delta(i,j)),$$

then $x(i,j)-\xi$ is selected as the final output.

Rule s4: if $$\max(\mu_{1\_unc}(\delta(i,j)), \mu_{1\_und}(\delta(i,j)), \mu_{1\_pos}(\delta(i,j)), \mu_{1\_neg}(\delta(i,j))) = \mu_{1\_neg}(\delta(i,j)),$$

then $x(i,j)+\xi$ is selected as the final output.

Hardware Synthesis Method of AWFM Filter

1. Generic LR Fuzzy Cells

The inventors have proposed a hardware synthesis method in *IEEE Trans. on Fuzzy Systems* Vol.6 (2) p266–285. The following bounded difference (equation 12) and (equation 13) can be used to represent LR fuzzy set (equation 1) and fuzzy interval (equation 5):

$$\mu_M(x) = LR\left(\frac{m_M \Theta x}{\alpha_M} + \frac{x\Theta m_M}{\beta_M}\right) \quad (12)$$

$$\mu_I(x) = LR\left(\frac{m_{ll}\Theta x}{\alpha_l} + \frac{x\Theta m_{lr}}{\beta_l}\right) \quad (13)$$

where $LR(z)=L(z)=R(z)$ for all real z and $\Theta$, a bounded difference operator, is defined by $a\Theta b=\max(a-b, 0)$ for any real a and b. According to the bounded difference equations, architecture of generic LR fuzzy implication cells can be described by the block diagrams in FIG. 2, including the substractor (SUB), the divider (DIV), LR(x), MAX and Minimum (MIN). In addition, (a) represents fuzzy sets with membership functions of single mode and (b) represents fuzzy intervals with mode intervals.

Hardaware synthesis of WFM filters comprises m+1 circuit modules. M moduleshave the same circuit architecture using nxn generic LR fuzzy cells with single mode membership grade and a defuzzification (DFZ) device. The other is the decision module ($y_{WFM}$) using m SUB circuits in current mode, a MAX circuit with multi-input and output for maximum value, and a priority selection circuit. Such a generic fuzzy cell represents an LR fuzzy set defined by parameters $[m, \alpha, \beta]_{LR}$ or $[ml, mr, \alpha, \beta]_{LR}$. Different types of fuzzy rules can be synthesize by the generic fuzzy cells. The input/output pin settings of the generic fuzzy cells are explained:

(1) $(\alpha, m, \beta)/(\alpha, ml, mr, \beta)$ parameters: input pins, which connect LR fuzzy set parameters of membership grade to generic cells (so that membership functions can be dynamically determined in run-time)
(2) x: input pin, which connects values of base variables to generic cells;
(3) vi: membership grade output from forward generic cells (not used in the present invention);
(4) $\mu(x)$: membership grade, or matching degree output
(5) h: height of the LR fuzzy set for the result membership grade (not used in the present invention).

FIG. 3 shows the detail circuits of the SUB and DIV blocks built by generic LR cells of membership grade. The P-type metal oxide semiconductor current mirror (cmirrorp) and N-type metal oxide semiconductor current mirror (cmirrom 2) are cascaded single output PMOS and cascaded PMOS/NMOS current mirror. Details of the analog current circuits are:

(A) the SUB block is responsible for bounded difference operations $m\Theta x$, $(m_1\Theta x)$, $x\Theta m$, (or $x\Theta m_r$). Calculations of difference are based on Kirchoff's current law and can be done by connecting m and x. Bound determination of the difference is done by the PMOS which is also the input of the current mirror in DIV.
(B) the DIV block is responsible for Iu/Is. To accomplish this, the squarer and the square-rooter should be serially connected (A is the constant current source). The squarer and the squarer-rooter are both designed according to Analysis and synthesis of MOS translinear circuits MOS translinear principle by R. J. Wiegerink in 1993. Ii denotes the current thru transistor Mi and ki denotes the transconductance of transistor Mi. For a squarer-rooter, when transistor M1 thru M4 are saturated, according to the characteristic function of transistors, one can obtain $$\sqrt{I_{1/k_1}} + \sqrt{I_{2/k_2}} = \sqrt{I_{3/k_3}} + \sqrt{I_{4/k_4}} \quad (14)$$

With appropriate circuits which make I3=I4, I1=Iu, and I2=A while k3=k4=k5=2k2=2k1, output of the square-rooter, Isqrt, can be solved:

$$I_{sqrt}=2\sqrt{A \times I_u} \qquad (15)$$

Similarly, the MOS translinear equation for a squarer can also be obtained:

$$\sqrt{I_{6/k_6}}+\sqrt{I_{7/k_7}}=\sqrt{I_{8/k_8}}+\sqrt{I_{9/k_9}} \qquad (16)$$

Hence, output of the DIV block, div, can be obtained if I6=I7=Is and k8=k9=k10=2k6=2k7:

$$div = \frac{I_{sqrt}^2}{4I_s} = \frac{(2\sqrt{A \times I_u})^2}{4I_s} = \frac{AI_u}{I_s} \qquad (17)$$

(C) LR(x) block is responsible for the triangular membership function of LR fuzzy sets. Definition of the membership function is LR(x)=AΘx. According to Kirchoffs current law, circuits for this block can be easily accomplished if constant current source A equals to the constant current source in the DIV block. According to the definition of LR(x), A represents the maximum membership grade and the maximum matching degree 1.

Because the MAX and MIN blocks are not used in the present invention, the MAX circuit is removed and the MIN circuit is replaced by a current mirror producing two equal outputs.

Figure 4:
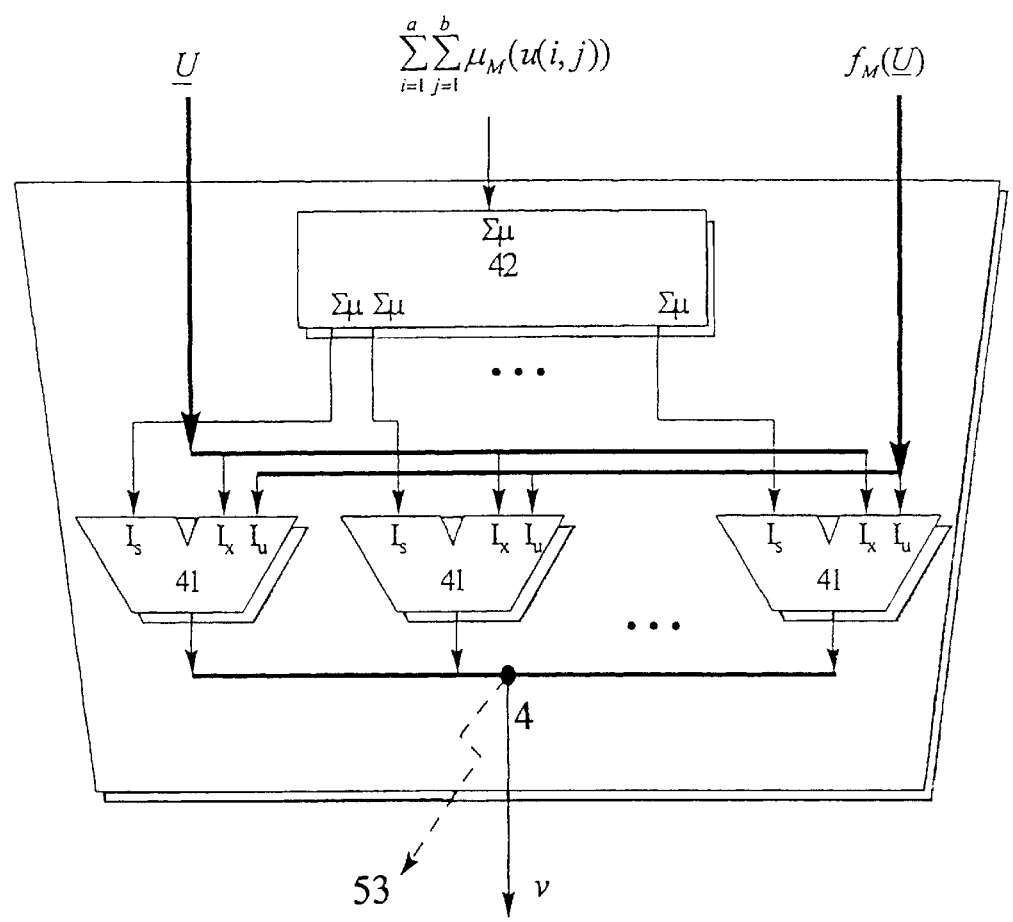

To accomplish equation (4) in [definition 1], the defizzification device is simplified as shown in FIG. 4. This device performs normalized weighted summation on inputs, where Mul/Div block which is responsible for multiplication and dividing has the same circuit as in FIG. 3(b). If input of the (i, j)th Mul/Div block is $$I_s = \sum_{k=1}^{a} \sum_{l=1}^{b} \mu_M(u(k, l))$$

$$I_u = \mu_M(u(i, j))$$

$$I_x = u(i, j)$$

output of the Mul/Div block becomes $$(Mul/Div)_{i,j} = \frac{u(i, j)\mu_M(u(i, j))}{\sum_{k=1}^{a} \sum_{l=1}^{b} \mu_M(u(k, l))}.$$

According to Kirchoffs current law, defuzzification v for "V is $f_M(U)$" can be obtained by connecting the outputs of the axb Mul/Div blocks. Therefore, fuzzy rules in [definition 1] can form matrix $f_M(U)$ from axb generic fuzzy cells. And generate v in equation (4) by a defuzzification device.

2. Hardware Fabrication of AWFM Filters

AWFM filters synthesized by generic LR fuzzy cells are described, including: generic LR fuzzy cells defining membership grade, a knowledge base of fuzzy rules, which varies parameters in membership functions with information from histograms so that the WFM filter, the fuzzy detector, and the dynamic selector are adaptive weighted; a non-linear weighted fuzzy mean filter, which removes high density Gaussian impulse noise from images. Via a single epoch, weights of the filter are adapted according to a set of fuzzy rules, which are constructed by a proposed procedure. All the fuzzy rules in the knowledge base infer concurrently for input nature estimation and filter adaptation. Statistic analyses ensure that this AWFM filtering possesses robust and consistent performance even when images are thoroughly polluted.

(a) WFM:

AWFM filters have a WFM filter receiving external input and are coupled to fuzzy detectors, which are used for input evaluation and prefilterng.

Figure 5A:
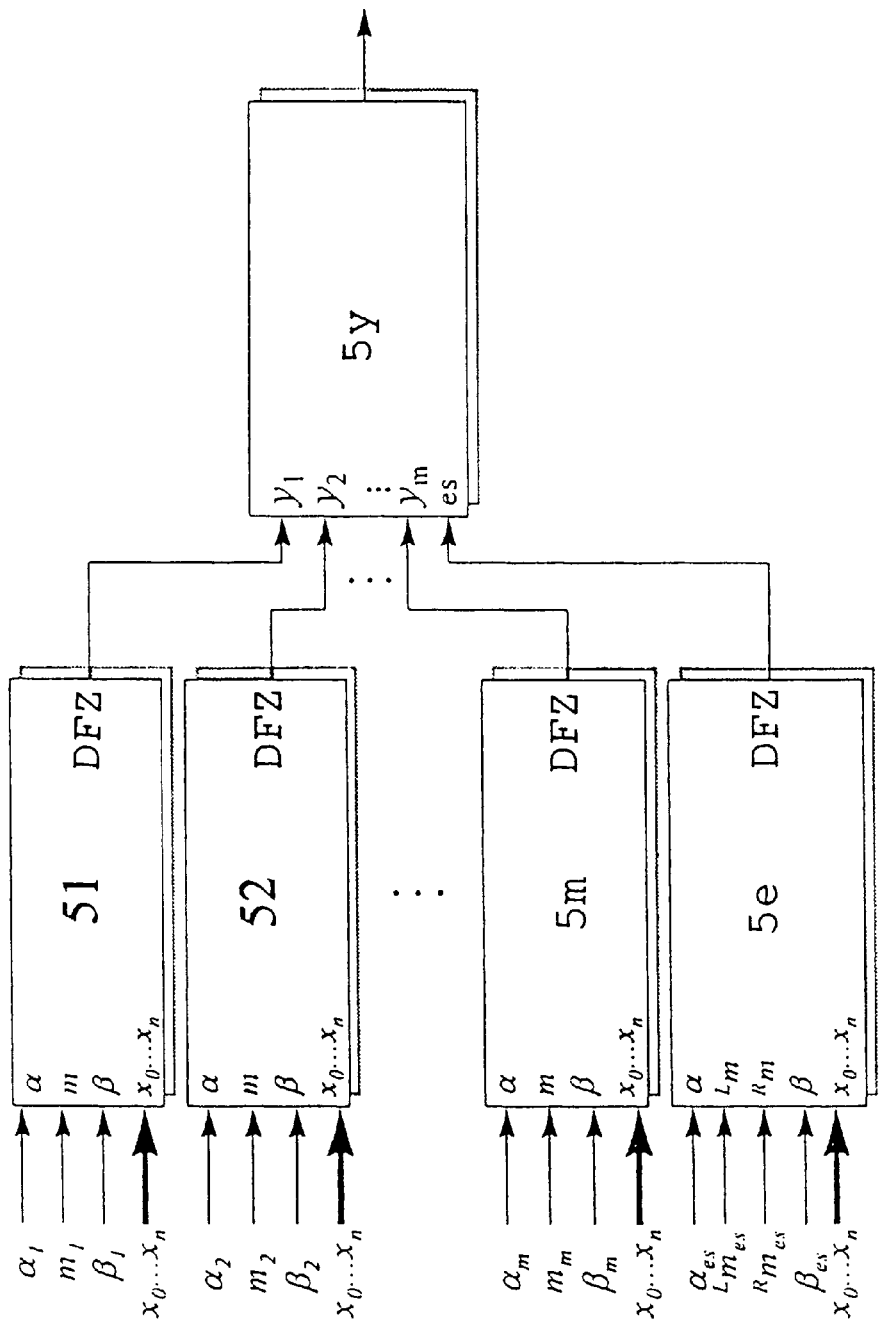
Figure 5B:
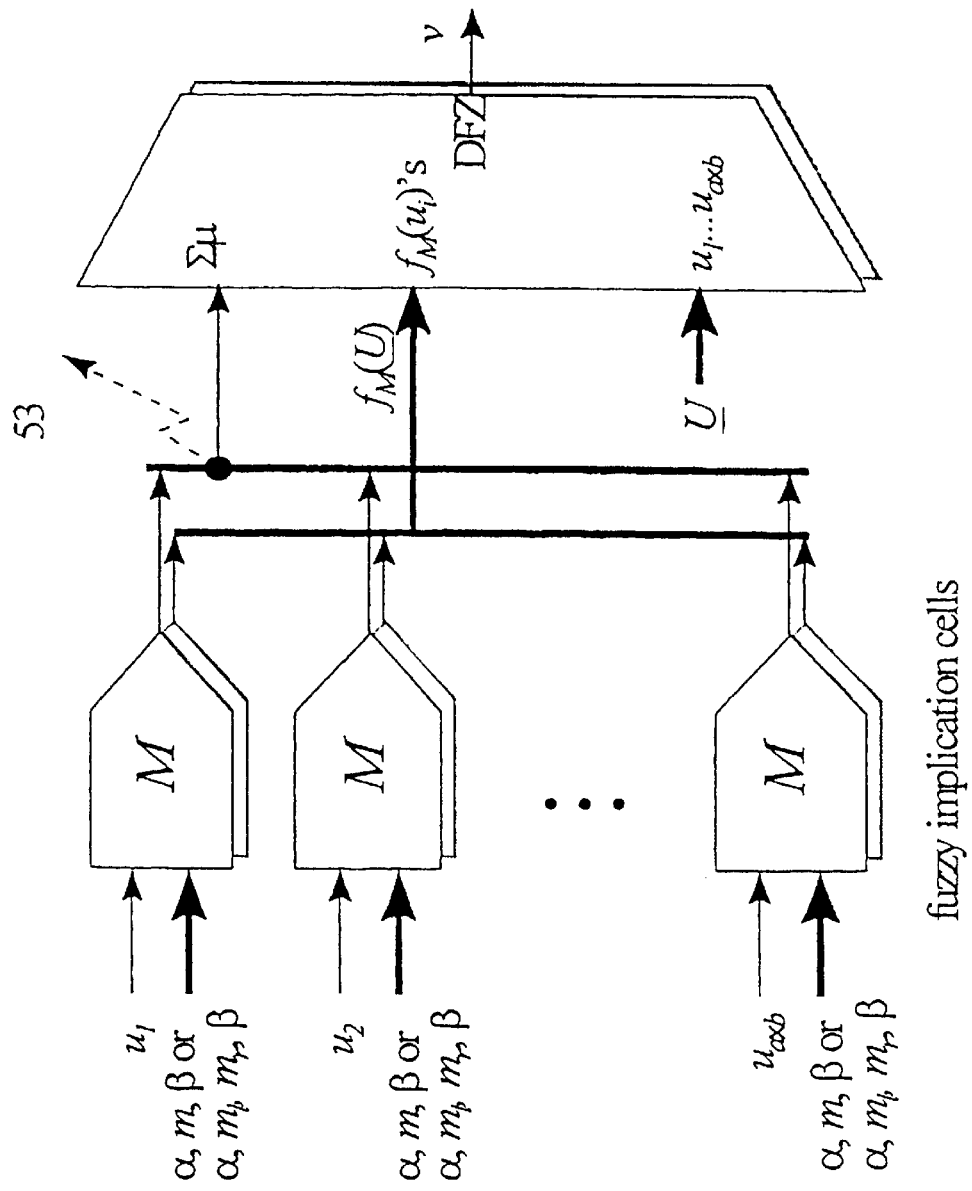

As shown in FIG. 5(a), the WFM filter consists of m+1 rule modules and a decision module. Four rule modules are utilized to accomplish Rule 1 thru Rule 4 in the present invention. The decision module accomplishing Rule 5 selects one output out of the m outputs, which is closest to the output of the fuzzy detector, as the final output of the WFM filter. Architecture of the rule modules are shown in FIG. 5(b), where the block marked M consists generic fuzzy cells representing fuzzy set M. The rule modules can be applied to all fuzzy rules defined. by [definition 1]. Matching degree $\mu_M(u(i,j))$'s are generated by the generic fuzzy cells. Then the outputs are divided by a current mirror into two equal parts of which one part represents the output itself and the other is summed to obtain the total of matching degree.

Figure 5C:
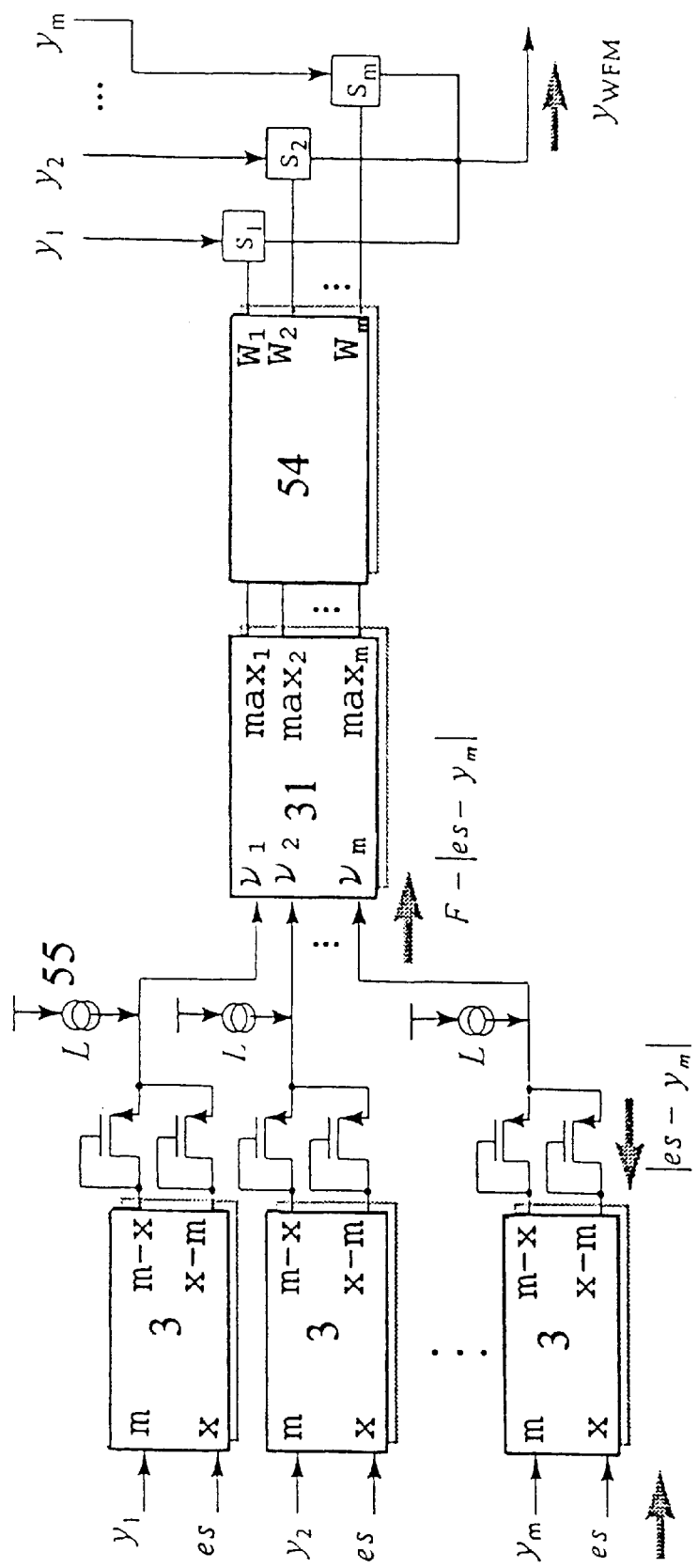

Because closest_to_ES in Rule 5 is not a fuzzy set of LR type, the WFM filter needs an additional decision module to accomplish Rule 5. The WFM decision module circuit consists of a SUB circuit for absolute value, a multi-input and output MAX circuit, an a priority selection circuit, as shown in FIG. 5(c). The decision module shown in FIG. 5(c) selects the input, which is closest to the output of the fuzzy detector, as the final output of WFM. To accomplish this, the SUB block in FIG. 5(c) calculates the absolute values of $|y_1-es|$, $|y_2-es|$, and $|y_m-es|$. After the constant L-1 (the maximum of gray level) is substracted by the smallest absolute value, the MAX block can receive the largest input. This SUB is the same as the generic fuzzy cells while the MAX is modified from the generic fuzzy cells. The multi-input and output MAX circuit utilizes differential techniques so that the output voltage corresponding to the largest current input is the lowest. Coupled with the priority selection circuit, the MAX circuit guarantees the decision module has the only output, as shown in FIG. 6.

Figure 6:
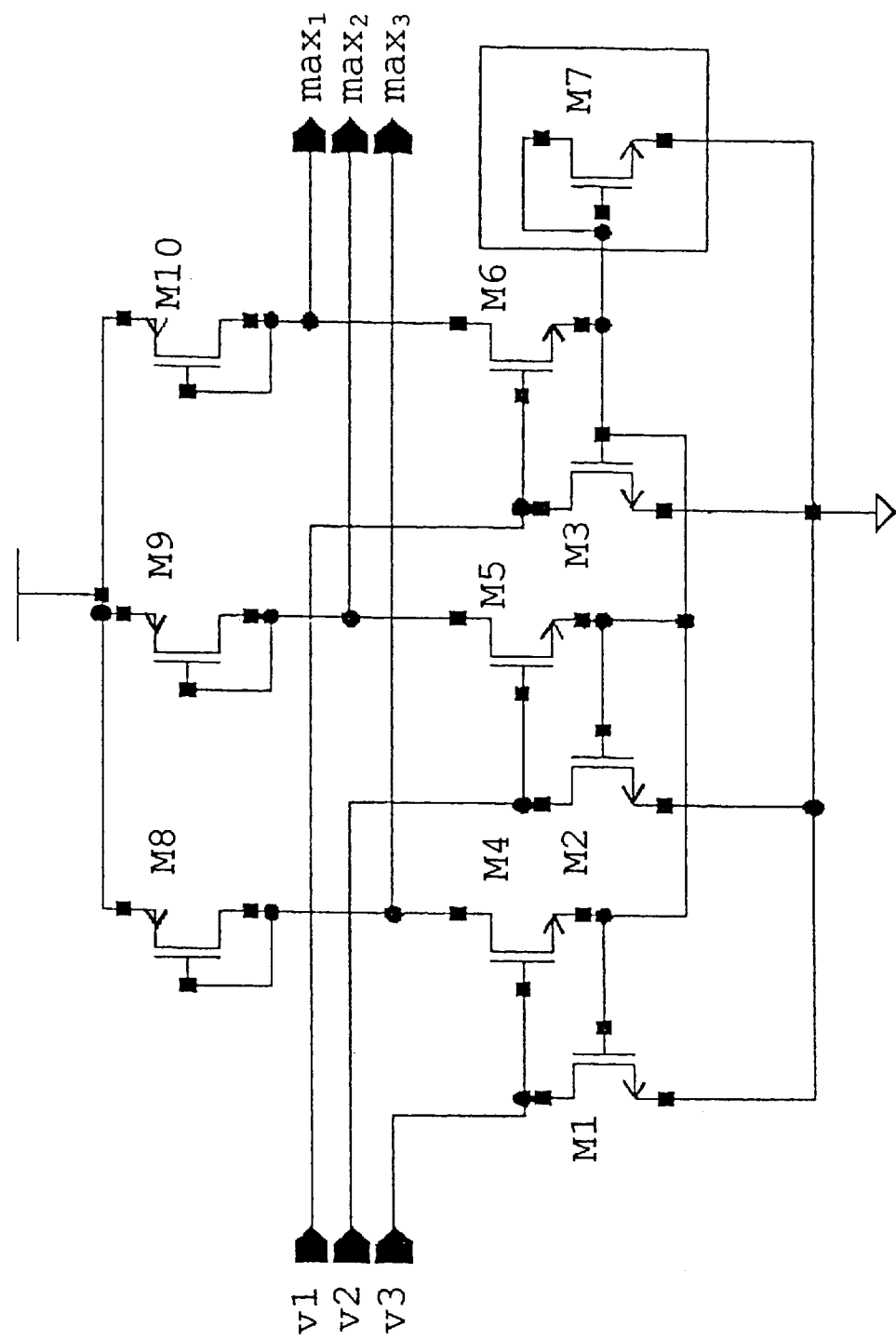
Figure 7:
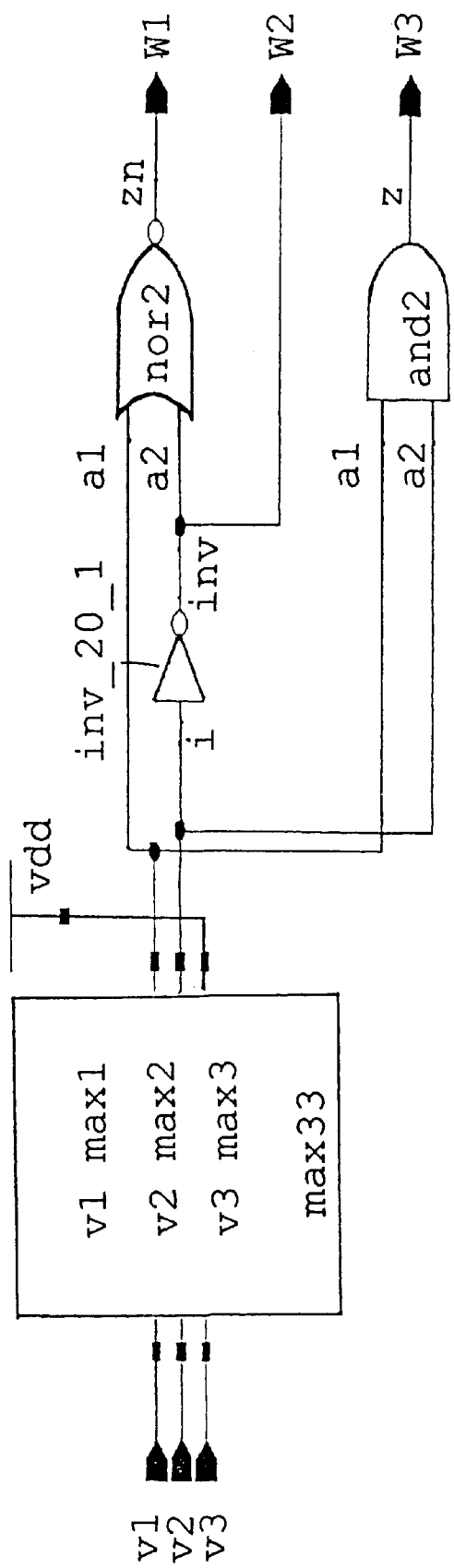
Figure 8:
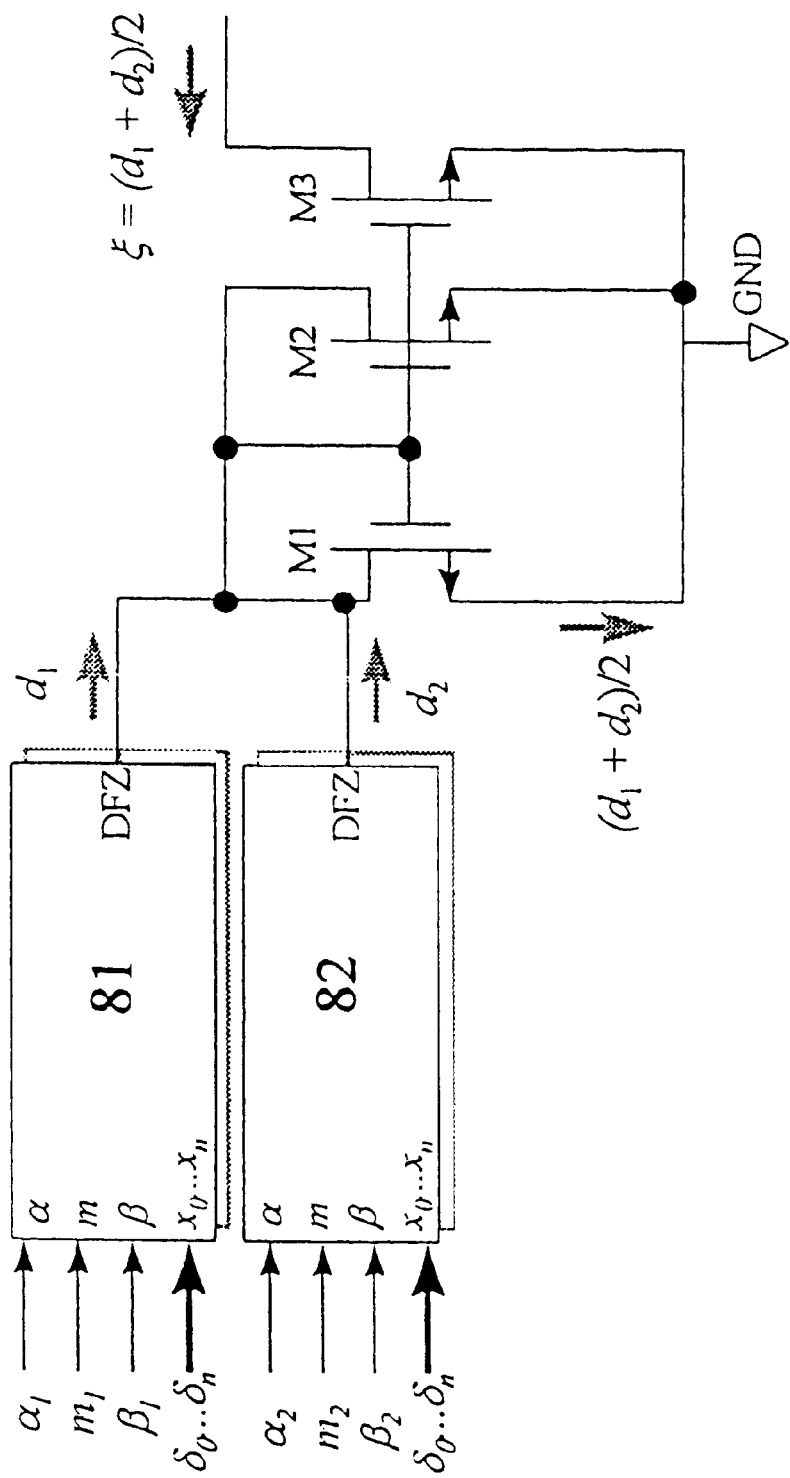

FIG. 6 shows the modified MAX circuit with three inputs and outputs. Supposing the input current $V_B$(B=1, 2, or 3) is the largest, it will build the largest drain to source voltage $V_{dsB}$ (with respect to $M_B$). When the potential difference between $V_{dsB}$ and $V_{dsi}$(i=1, 2, or 3; but i doesn't equal to B) is more than $$\sqrt{\frac{2I_{ds7}}{k_7}},$$

the current $V_B$ will be directed into the differential circuit Mi+3 built with M4 thru M7. This MB+3 has the largest gate voltage equal to $V_{dsB}$. Consequently, only pin maxp (p=4−B) has low voltage which enables switch sp to select current yp as the WFM output. To ensure only one switch can be enable at a time, the circuit for priority selection and MAX circuit must work together. FIG. 7 shows the priority selection circuit.

Table 1 shows the truth table of the priority selection circuit, where $w_1$ thru $W_3$ represent the enable signal of s1 thru s3. Impossible configurations in the table have been grayed out. For current $y_2$ of fuzzy mean $y_{MD}$ has better chance to be the desired fuzzy mean, the priority follows $y_2$->$y_1$->$y_3$ ($y_{MD}^-$>$y_{DK}^-$>$y_{BR}$). Therefore enable signals in every switch can be expressed by:

$w_1=\overline{max_1}max_2$, $w_2=\overline{max_2}$, and $w_3=max_1\ max_2$ (b) Fuzzy Detector:

The fuzzy detector receives external input and couples the WFM filter and the dynamic selector in order to estimate amplitude of the noise at the centroid of a n×n sampling window by comparing the external input and the signal pre filtered by the WFM filter.

Because the fuzzy detector utilizes a set of fuzzy rules in the fuzzy interval to detect noise amplitude, hardware architecture in FIG. 5(b) can also be used to accomplish the fuzzy rules defined by [definition 7]. Rule d3 can be simplified as a circuit mirror constructed by three transistors in FIG. 8, for it obtains the average between outputs from Rule d1 and Rule d2. On the other hand, the fuzzy detector utilizes two rule modules to accomplish Rule d1 and Rule d2.

(c) Dynamic Selector:

The dynamic selector couples the fuzzy detector and receives external input and the signal pre filtered by the WFM filter in order to determine the final output among the external input, the external input deducted by the positive noise amplitude detected by the fuzzy detector, the external input plus the absolute value of the negative noise amplitude detected by the fuzzy detector, and the signal pre filtered by the WFM filter.

Adaptation for the membership function of fuzzy rules in the fuzzy rule knowledge base can be carried out in difference ways; by a static knowledge base: adaptation is done with parameters in the standard reference image database and membership functions of the polluted image; by a dynamic knowledge base: adaptation is done with parameters in the standard reference image database as well as membership function of the polluted image is sent.

Figure 9:
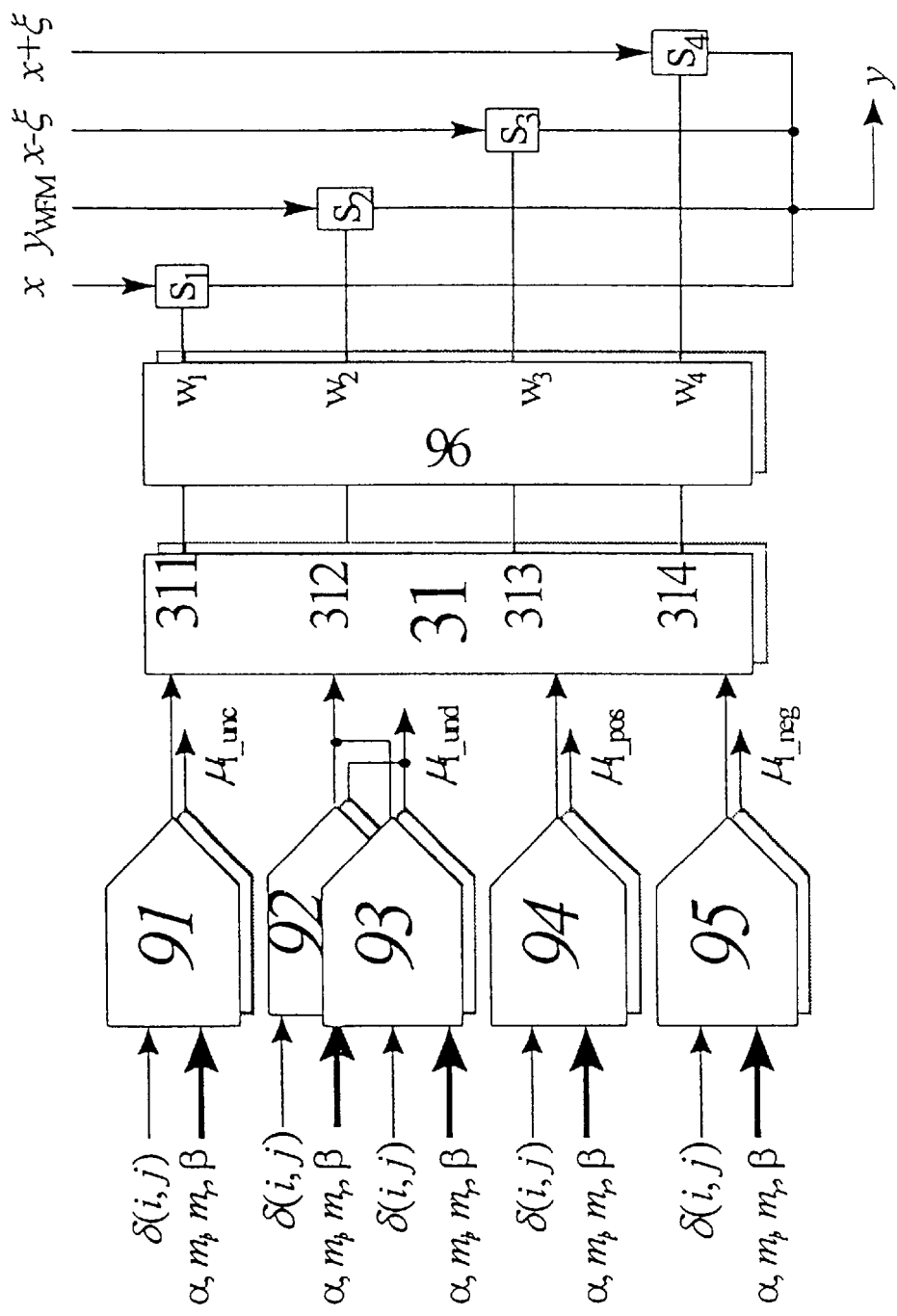
Figure 10A:
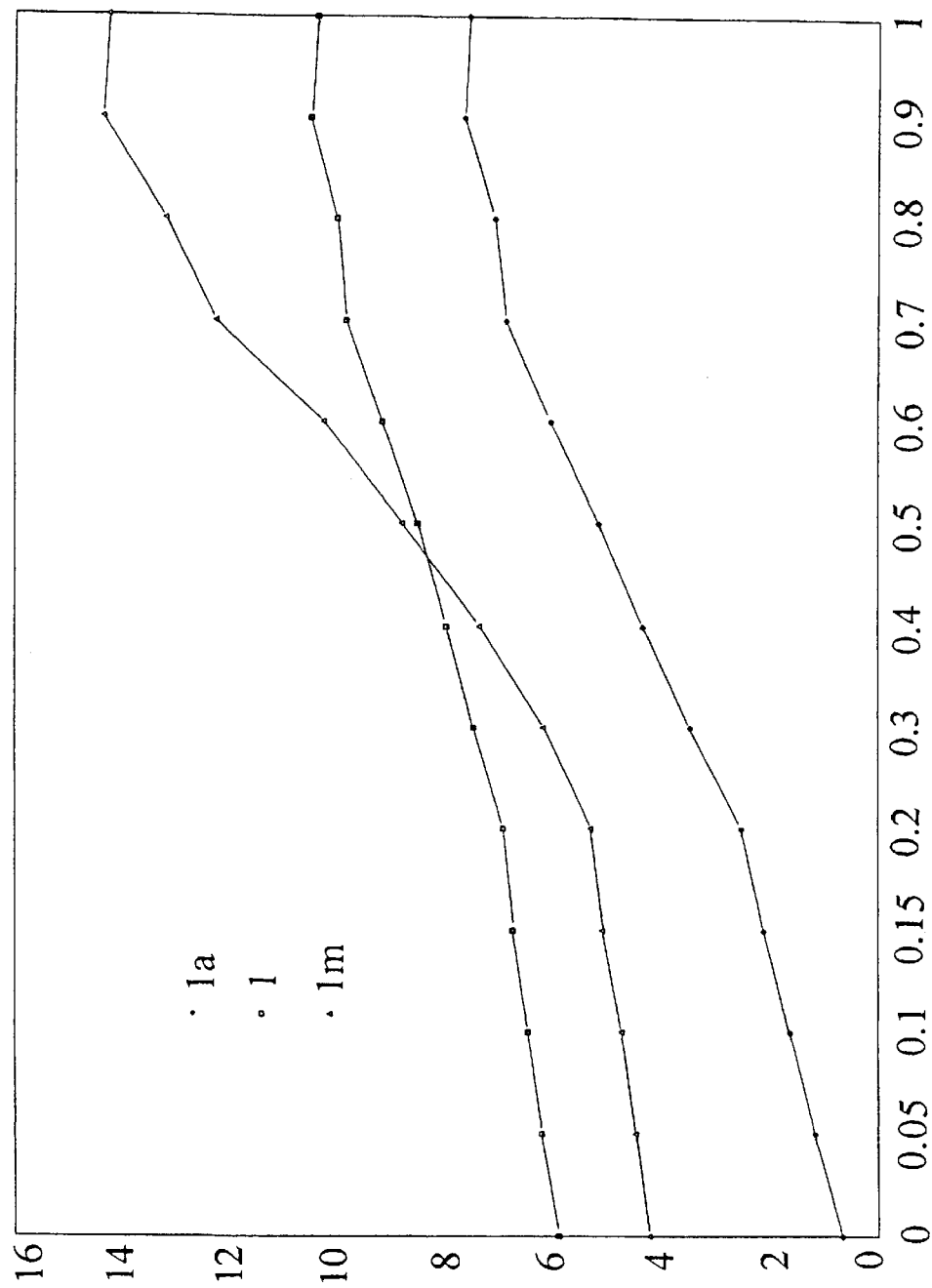
Figure 10B:
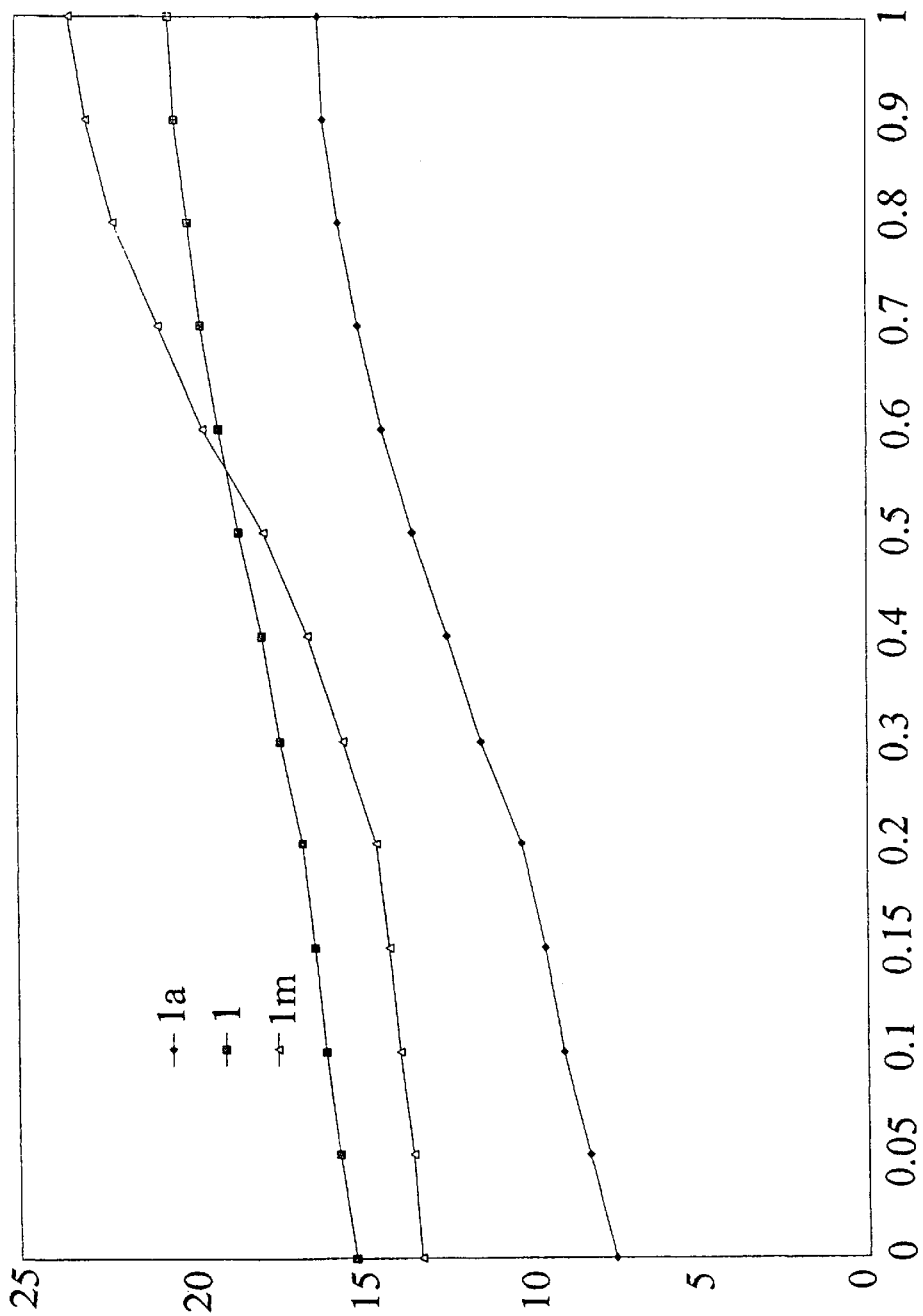
Figure 10D:
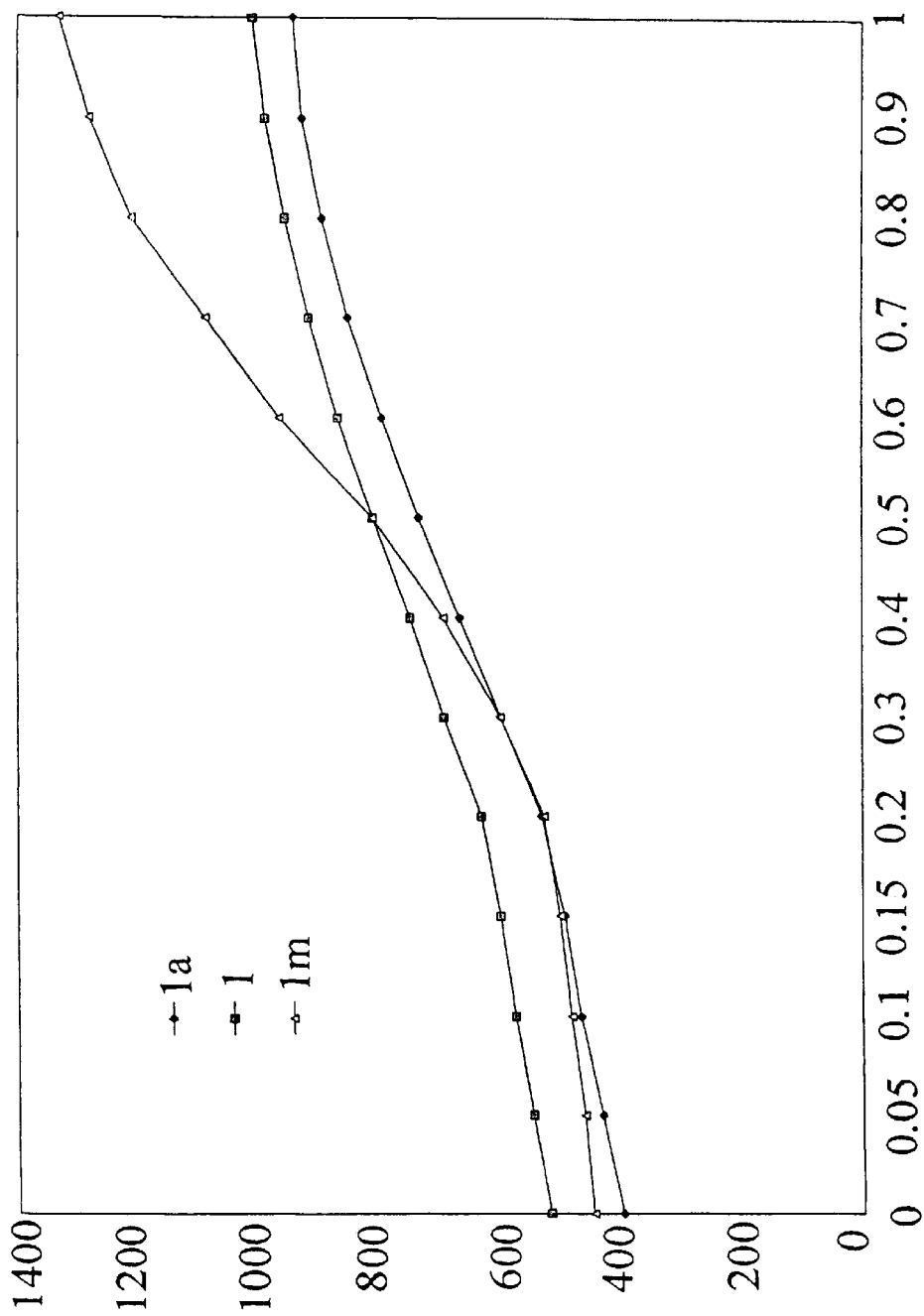

The dynamic selector basically consists of compactors for matching degree. Membership grade for the difference between the WFM output and the original input in each fuzzy interval can be obtained by generic fuzzy implication cells. The multi-input and output MAX circuit and the priority selection circuit use the membership grade to select the best AWFM output dynamically. FIG. 9 shows architecture of the dynamic selector, where x is the input of AWFM, $y_{WFM}$ is the output of WFM, $\xi$ is the noise detected by the fuzzy detector. For fuzzy interval I_und is constructed by two independent convex fuzzy intervals, five generic fuzzy cells are necessary to accomplish the fuzzy intervals in Rule s1 thru s4. Expanding the three input MAX circuit in FIG. 6 to four input circuit, the MAX circuit select the largest among $u_{I\_unc}$ (67 (i, j)), $u_{1\_und}(\delta(i, j))$, $u_{1\_pos}(\delta(i, j))$, and $u_{1\_neg}(\delta(i, j))$. Supposing $u_B$ is the largest (B belongs to {I_unc, I_und, I_pos, I_neg}, its corresponding output in MAX has the lowest voltage and the priority selection circuit enables the corresponding switch. Because fuzzy interval I_und overlaps other intervals, high priority is reserved for $y_{WFM}$ by the priority selection circuit while x, x, x+$\xi$, and x-$\xi$ share the same priority, as shown in table 2. Truth table for switch s1, s2, s3, and s4 as well as enable signal w1, w2, w3, and w4 is as followed:

$w_1 = \overline{max_1 max_2}, w_2 = \overline{max_2}, w_3 = max_2 \overline{max_3}$ and $w_4 = max_2 \overline{max_4}$ 3. Simulation Results Comparing with filters based on sorting techniques (see L. Yin in *IEEE Trans. Circuits Syst. II* Vol. 43 (3) p157–192 (1996), J. Offen etc. in VLSI image processing, or Catherine Heimburger etc. in 1996 U.S. Pat. No. 5,490,094), the stability and effectiveness of WFM has been proved by C. S. Lee etc. in Int. J. Fuzzy Sets and SystemsVol 89 (2) p157–180 (1997). To further demonstrate effectiveness of the present invention, AWFM, WFM, and median filters are compared. Assuming a and b in. [definition 1], which defines the sampling window, take the value of 3; gray level of the image falls in [0, 255], which corresponds to the condition: n=8 in [definition 5]; original image is polluted by Gaussian impulse noise or additional impulse noise with ratio p, which means that the chance for each pixel to be polluted by both positive and negative impulse are p/2; the input, x, is a Bernoulli random variable, where $$x(i, j) = \begin{cases} s(i, j) \oplus n(i, j), & \text{with probability } \frac{p}{2} \\ s(i, j) \ominus n(i, j), & \text{with probability } \frac{p}{2} \\ s(i, j), & \text{with probability } 1 - p \end{cases}$$

This equation can also be applied to the color imaging system reported by C. S. Lee in *Proc. of Seven IFSA World Congress*, p279–284, Prague, (1997). Various polluted conditions are introduced to test the AWFM filter. The first experiment tests the ability of removing noise based on MAE and MSE. The results are shown in FIG. 10(a)–(d). The second experiment tests the effectiveness of the fuzzy detector, where the proposed detector is compared to conventional crisp weighted detector and the impulse amplitude for testing is 100. FIGS. 11, 12, 13, and 14 show the comparisons. It is shown that output of the fuzzy detector is closer to the real impulse amplitude and has higher stability.

The effectiveness is also evaluated visually. FIG. 15 and 17 show the polluted and the filtered images while FIG. 18 and FIG. 19 show the testing results for image "Baboon", in which Gaussian impulse noise with zero mean=5 and random impulse noise with p=0.2 and 1.0 are mixed. It is obvious that the recoveries of AWFM filters is superior independent of the noise ratio. AWFM filters are shown to have better stability over conventional techniques. Table 3 summarizes the comparisons among filters of various types qualitatively.

4. Advantages and Functions

The present invention proposes a new type of AWFM filter with high stability. The filter is governed by fuzzy rules and can substantially remove Gaussian impulse noise from images with low, high s/n ratio, or even densely polluted. Besides, the AWFM filter in the present invention has the following advantages:

1. non-linear, adaptive, and time-variant;
2. on-line self-adaptive accomplished by the forward fuzzy implication which can estimate features of the input with one adaptation,
3. high estimation efficiency due to concurrent fuzzy implication,
4. hardware fabrication simplicity for using similar fuzzy rule architecture,
5. images polluted in any conditions can be recovered due to the high stability, As to hardware synthesis, AWFM filters shares the advantages of. generic LR fuzzy cells, including:

1. high speed: each fuzzy rule is inferred by fuzzy implication cells and each fuzzy implication cell can conduct 20,000,000 fuzzy implications per second,
2. superior noise immunity: all the transistors in the circuits are saturated when the input falls in the defined intervals,
3. small circuit and low circuit complexity: AWFM filters utilizes the same fuzzy implication cells so that simple circuit architecture is possible and hence the area is reduced while the density is increased.

TABLE 1

| max$_1$ | max$_2$ | max$_3$ | W$_1$ | W$_2$ | W$_3$ |
|---|---|---|---|---|---|
| | | | Enable | | |
| 0 | 0 | 0 | 0 | 1 | 0 |
| 0 | 0 | 1 | 0 | 1 | 0 |
| 0 | 1 | 0 | 1 | 0 | 0 |
| 0 | 1 | 1 | 1 | 0 | 0 |
| 1 | 0 | 0 | 0 | 1 | 0 |
| 1 | 0 | 1 | 0 | 1 | 0 |
| 1 | 1 | 0 | 0 | 0 | 1 |
| 1 | 1 | 1 | 0 | 0 | 0 |

TABLE 2

| max$_1$ | max$_2$ | max$_3$ | max$_4$ | W$_1$ | W$_2$ | W$_3$ | W$_4$ |
|---|---|---|---|---|---|---|---|
| | | | | Enable | | | |
| 0 | 0 | 1 | 1 | 0 | 1 | 0 | 0 |
| 0 | 1 | 1 | 1 | 1 | 0 | 0 | 0 |
| 1 | 0 | 0 | 1 | 0 | 1 | 0 | 0 |
| 1 | 0 | 1 | 0 | 0 | 1 | 0 | 0 |
| 1 | 0 | 1 | 1 | 0 | 1 | 0 | 0 |
| 1 | 1 | 0 | 1 | 0 | 0 | 1 | 0 |
| 1 | 1 | 1 | 0 | 0 | 0 | 0 | 1 |

TABLE 3

| | Arithmetic mean | Geometric mean | Lp Mean | Conta Harmonic Mean | WFM | AWFM | Median |
|---|---|---|---|---|---|---|---|
| Short-tailed Additive noise | good | good | good | good | Poor | poor | poor |
| Median-tailed Additive noise | poor | poor | poor | poor | Poor | good | poor |
| Long-tailed Additive noise | poor | poor | Poor | poor | good | good | good |
| Positive spikes | poor | poor | Good | good | good | good | good |
| Negative spikes | poor | poor | Good | good | good | good | good |
| Mixed spikes | poor | poor | Poor | poor | good | good | good |

What is claimed is:

1. An AWFM filter comprises:
generic LR fuzzy cells synthesizing the filter and a fuzzy rule knowledge base which adjusts parameters in a membership function according to a histogram so that a WFM filter, a fuzzy detector, and a dynamic selector can be weighted;
a non-linear weighted fuzzy mean filter for removing high density Gaussian impulse noises in polluted images;
a single epoch, weights of the AWFM filter are adapted according to a small set of fuzzy rules, constructed by a proposed procedure;
all the fuzzy rules in the fuzzy rule knowledge base infer concurrently for input nature estimation and filter adaptation, and statistic analyses ensure that the filtering of the AWFM filter possesses robust and consistent performance even when images are thoroughly polluted;
the WFM filter receives external input and couples the fuzzy detector in order to estimate input characteristics of an input as well as to pre-filter noise,
the WFM filter includes four fuzzy rules
the first fuzzy rule finds portions of the filtered image with darker brightness;
the second fuzzy rule finds portions of the filtered image with medium brightness;
the third fuzzy rule finds portions of the filtered image with lighter brightness; and
the fourth fuzzy rule finds portions of the filtered image with maximum likelihood brightness.

2. The AWFM filter as claimed in claim 1, in which adaptation for the membership function of fuzzy rules in the fuzzy rule knowledge base is carried out by a static knowledge base where parameters in a standard reference image database as well as membership function of a polluted image is sent.

3. The AWFM filter as claimed in claim 1, in which hardware synthesis is accomplished by said generic LR fuzzy cells operating in analog current mode.

4. The AWFM filter as claimed in claim 1, in which the generic LR fuzzy cells comprises two types of LR fuzzy implication cells for SUB, DIV, LR (x), MAX, and MIN functions,
fuzzy sets of membership functions with single mode,
fuzzy intervals with mode intervals; and
defuzzification devices.

5. The AWFM filter as claimed in claim 1, in which the WFM fuzzy estimator circuit utilizes generic fuzzy implication cells with fuzzy intervals and a defuzzification cell for fuzzy estimations.

6. The AWFM filter as claimed in claim 1, in which hardware synthesis of fuzzy rules in the knowledge base utilizes generic fuzzy implication cells with fuzzy intervals and a defuzzification cell to synthesize fuzzy rules.

7. The AWFM filter as claimed in claim 7, in which hardware synthesis of the WFM filter includes m+1 rule modules;
m of the modules have n×n the same generic LR fuzzy cells with single mode LR fuzzy set and a defuzzification cell while the other have
a fuzzy estimator utilizes n×n generic LR fuzzy cells with fuzzy intervals and a defuzzification cell; and
a decision module utilizes m SUB circuits for absolute value in current mode, a MAX circuit with multi-inputs and outputs, and a set of circuits for priority selection.

8. The AWFM filter as claimed in claim 7, in which m is determined by a fuzzy set number of the fuzzy rules referenced by the WFM filter.

9. The AWFM filter as claimed in claim 7, in which the WFM filter decision module comprises SUB circuit for absolute values, MAX circuit with multi-inputs and outputs, and a selection circuit for priority.

10. The AWFM filter as claimed in claim 7, in which the MAX circuit with multi-inputs and outputs utilizes a differential method so that a voltage output corresponding to a largest input current is the lowest, and is coupled with a circuit for priority selection, the MAX circuit guarantees the decision module has the only output.

11. The AWFM filter as claimed in claim 10, in which subjecting to the circuit for priority selection and the MAX circuit, only one switch, which corresponds to the largest current input, is energized.

12. An AWFM filter comprises:

generic LR fuzzy cells synthesizing the filter and a fuzzy rule knowledge base which adjusts parameters in a membership function according to a histogram so that a WFM, filter, a fuzzy detector, and a dynamic selector can be weighted;

a non-linear weighted fuzzy mean filter for removing high density Gaussian impulse noises in polluted images;

a single epoch, weights of the AWFM filter are adapted according to a small set of fuzzy rules, constructed by a proposed procedure;

all the fuzzy rules in the fuzzy rule knowledge base infer concurrently for input nature estimation and filter adaptation, and statistic analyses ensure that the filtering of the AWFM filter possesses robust and consistent performance even when images are thoroughly polluted;

the fuzzy detector receives external input and couples the WFM, filter and the dynamic selector in order to estimate amplitude of noise at a centroid of a n×n sampling window by comparing an external input and a signal pre-filtered by the WFM filter, the fuzzy detector utilizes three fuzzy rules including the first fuzzy rule detects the amplitude of the positive Guassian impulse noise;

the second fuzzy rule detects the amplitude of the negative Guassian impulse noise; and the third fuzzy rule detects the amplitude of the average Guassian impulse noise.

13. The AWFM filter as claimed in claim 12, in which the fuzzy detector circuit utilizes rule modules and a current mirror to detect noise amplitude.

14. An AWFM filter comprises:

generic LR fuzzy cells synthesizing the filter and a fuzzy rule knowledge base which adjusts parameters in a membership function according to a histogram so that a WFM filter, a fuzzy detector, and a dynamic selector can be weighted;

a non-linear weighted fuzzy mean filter is capable of removing high density Gaussian impulse noises in polluted images;

a single epoch, weights of the AWFM filter are adapted according to a small set of fuzzy rules, constructed by a proposed procedure;

all the fuzzy rules in the fuzzy rule knowledge base infer concurrently for input nature estimation and filter adaptation, and statistic analyses ensure that the filtering of the AWFM filter possesses robust and consistent performance even when images are thoroughly polluted, the dynamic selector couples the fuzzy detector and receives external input and a signal pre-filtered by the WFM filter to determine a final output among an external input, the external input deducted by a positive noise amplitude detected by the fuzzy detector, the external input plus an absolute value of a negative noise amplitude detected by the fuzzy detector, and the signal pre-filtered by the WFM filter, the dynamic selector utilizes four fuzzy rules including the first fuzzy rule selects the WFM filter input as the final AWFM filter output;

the second fuzzy rule selects the WFM filter output as the final AWFM filter output;

the third fuzzy rule selects the WFM filter output deducted by the fuzzy detector output as the final AWFM filter output; and the fourth fuzzy rule selects the WFM filter output plus the fuzzy detector output as the final AWFM filter output.

15. The AWFM filter as claimed in claim 14, in which the dynamic selector circuit utilizes generic fuzzy implication cells to obtain the membership grade in each fuzzy interval for the difference between the WFM filter output and the original input; and preferable AWFM filter output can be dynamically determined by the membership grades, the MAX circuit, and the circuit for priority selection.

* * * * *